(12) United States Patent
Padmanabhan et al.

(10) Patent No.: US 9,973,382 B2
(45) Date of Patent: May 15, 2018

(54) HITLESS UPGRADE FOR NETWORK CONTROL APPLICATIONS

(71) Applicant: Nicira, Inc., Palo Alto, CA (US)

(72) Inventors: Amar Padmanabhan, Menlo Park, CA (US); Jeremy Stribling, San Francisco, CA (US); W. Andrew Lambeth, San Mateo, CA (US); Natasha Gude, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 676 days.

(21) Appl. No.: 14/069,267

(22) Filed: Oct. 31, 2013

(65) Prior Publication Data

US 2015/0049632 A1  Feb. 19, 2015

Related U.S. Application Data

(60) Provisional application No. 61/866,525, filed on Aug. 15, 2013.

(51) Int. Cl.
 *H04L 12/24* (2006.01)
 *H04L 29/08* (2006.01)
(52) U.S. Cl.
 CPC ............ *H04L 41/082* (2013.01); *H04L 67/34* (2013.01)
(58) Field of Classification Search
 None
 See application file for complete search history.

(56) References Cited

U.S. PATENT DOCUMENTS

| | | | |
|---|---|---|---|
| 5,504,921 | A | 4/1996 | Dev et al. |
| 5,550,816 | A | 8/1996 | Hardwick et al. |
| 5,729,685 | A | 3/1998 | Chatwani et al. |
| 5,751,967 | A | 5/1998 | Raab et al. |
| 5,796,936 | A | 8/1998 | Watabe et al. |
| 5,805,791 | A | 9/1998 | Grossman et al. |
| 6,104,699 | A | 8/2000 | Holender et al. |
| 6,219,699 | B1 | 4/2001 | McCloghrie et al. |
| 6,512,745 | B1 | 1/2003 | Abe et al. |
| 6,539,432 | B1 | 3/2003 | Taguchi et al. |
| 6,680,934 | B1 | 1/2004 | Cain |
| 6,768,740 | B1 * | 7/2004 | Perlman et al. ............... 370/392 |

(Continued)

FOREIGN PATENT DOCUMENTS

| | | |
|---|---|---|
| AU | 2012328699 | 4/2014 |
| EP | 1443423 | 8/2004 |

(Continued)

OTHER PUBLICATIONS

Author Unknown, "Private Network-Network Interface Specification Version 1.1 (PNNI 1.1)," The ATM Forum Technical Committee, Apr. 2002, 536 pages, The ATM Forum.

(Continued)

*Primary Examiner* — Christine Duong
(74) *Attorney, Agent, or Firm* — Adeli LLP

(57) ABSTRACT

A method for upgrading a set of controller nodes in a controller cluster that manages a plurality of forwarding elements in a way that minimizes dataplane outages. The method of some embodiments upgrades the control applications of a subset of the controller nodes before upgrading a decisive controller node. Once the decisive controller node is upgraded, the method switches the controller cluster to use a new version of the control applications.

20 Claims, 16 Drawing Sheets

(56) References Cited

U.S. PATENT DOCUMENTS

| | | |
|---|---|---|
| 6,785,843 B1 | 8/2004 | McRae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 2003/0093481 A1 | 5/2003 | Mitchell et al. |
| 2004/0044773 A1 | 3/2004 | Bayus et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0297428 A1 | 12/2007 | Bose et al. |
| 2008/0002579 A1 | 1/2008 | Lindholm et al. |
| 2008/0034249 A1 | 2/2008 | Husain et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0165704 A1 | 7/2008 | Marchetti et al. |
| 2009/0276661 A1 | 11/2009 | Deguchi et al. |
| 2009/0279549 A1* | 11/2009 | Ramanathan et al. ..... 370/395.4 |
| 2010/0002722 A1 | 1/2010 | Porat et al. |
| 2010/0058106 A1 | 3/2010 | Srinivasan et al. |
| 2010/0162036 A1* | 6/2010 | Linden et al. ................. 714/4 |
| 2010/0205479 A1 | 8/2010 | Akutsu et al. |
| 2011/0103259 A1 | 5/2011 | Aybay et al. |
| 2011/0134931 A1 | 6/2011 | Merwe et al. |
| 2011/0317559 A1 | 12/2011 | Kern et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2013/0044752 A1 | 2/2013 | Koponen et al. |
| 2013/0054761 A1 | 2/2013 | Kempf et al. |
| 2013/0058358 A1* | 3/2013 | Fulton et al. ................. 370/412 |
| 2013/0091310 A1* | 4/2013 | Caballero .................. 710/62 |
| 2013/0211549 A1 | 8/2013 | Thakkar et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0332602 A1 | 12/2013 | Nakil et al. |
| 2013/0332619 A1 | 12/2013 | Xie et al. |
| 2014/0101652 A1* | 4/2014 | Kamble .............. G06F 9/45558 717/171 |
| 2014/0247753 A1 | 9/2014 | Koponen et al. |
| 2014/0348161 A1 | 11/2014 | Koponen et al. |
| 2014/0351432 A1 | 11/2014 | Koponen et al. |

FOREIGN PATENT DOCUMENTS

| | | |
|---|---|---|
| EP | 2748990 | 7/2014 |
| GB | 2485866 | 5/2012 |
| WO | WO 2013/063332 | 5/2013 |
| WO | WO 2013/158917 | 10/2013 |
| WO | WO 2013/158918 | 10/2013 |
| WO | WO 2013/158920 | 10/2013 |
| WO | WO 2013/184846 | 12/2013 |

OTHER PUBLICATIONS

Author Unknown, "Virtual Machine Backup Guide," Nov. 2007, pp. 1-78, VMware, Inc., Palo Alto, California.
Belaramani, Nalini, et al., "PRACTI Replication," Proc. of NSDI, May 2006, 14 pages.
Casado, Martin, et al., "SANE: A Protection Architecture for Enterprise Networks," Proceedings of the 15th USENIX Security Symposium, Jul. 31, 2006, pp. 137-151.
Ciavaglia, Laurent, et al., "An Architectural Reference Model for Autonomic Networking, Cognitive Networking and Self-management," Draft ETSI GS AFI 002 V0.0.17, Mar. 2012, 179 pages, http://www.etsi.org.
Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.
Koponen, Teemu, et al., "Onix: A Distributed Control Platform for Large-scale Production Networks," In Proc. OSDI, Oct. 2010, pp. 1-14.
Krishnaswamy, Umesh, et al., "ONOS Open Network Operating System—An Experimental Open-Source Distributed SDN OS," Apr. 16, 2013, 4 pages.
Pankaj, Berde, et al., "ONOS Open Network Operating System An Open-Source Distributed SDN OS," Dec. 19, 2013, 44 pages.
Schneider, Fred B., "Implementing Fault-Tolerant Services Using the State Machine Approach: A Tutorial," ACM Computing Surveys, Dec. 1990, 21 pages, vol. 22, No. 4, ACM.
Stribling, Jeremy, et al., "Flexible, Wide-Area Storage for Distributed Systems with WheelFS," NSDI '09: 6th USENIX Symposium on Networked Systems Design and Implementation, Apr. 2009, pp. 43-58, USENIX Association.
Terry, Douglas B., "Managing Update Conflicts in Bayou, a Weakly Connected Replicated Storage System," SIGOPS '95, Dec. 1995, pp. 172-183, ACM, Colorado, USA.

* cited by examiner

HITLESS UPGRADE FOR NETWORK CONTROL APPLICATIONS

CLAIM OF BENEFIT TO PRIOR APPLICATIONS

This application claims benefit to U.S. Provisional Patent Application 61/866,525, filed Aug. 15, 2013, which is incorporated herein by reference.

BACKGROUND

Controller nodes in a controller cluster manage the processing of packets by forwarding elements in a network control system. The forwarding elements (e.g., switches, routers, etc.) manage the sending of packets between various physical and virtual elements.

Upgrading the controller nodes in a controller cluster may cause a dataplane outage. The forwarding of packets and responses to Application Programming Interface (API) requests become unreliable during the upgrade of the individual controller nodes when different versions of the controller nodes are running in the controller cluster if the upgrade is not implemented properly.

It is difficult to upgrade all of the controller nodes in a controller cluster in a way that does not cause the dataplane to be unavailable during a transition. During upgrades, the controller cluster should be able to respond to API requests and other external events (e.g., virtual machine (VM) creation/mobility).

BRIEF SUMMARY

Some embodiments of the invention provide a method for upgrading a set of controllers in a controller cluster in a way that minimizes dataplane outages. In some embodiments, the controllers are part of a network control system that manages forwarding elements. The forwarding elements forward data between several computing devices (or hosts), some or all of which execute one or more virtual machines (VMs). The controllers in some embodiments execute a set of network control applications in order to manage sets of logical and physical forwarding elements. In some embodiments, the controllers use the set of network control applications to implement a set of logical forwarding elements on the physical forwarding elements.

The method of some embodiments sets up a new version of the network control applications on a subset of the controllers. In some embodiments, the method continues to use the remaining controllers (i.e., the controllers running the old version) to manage the forwarding elements while the subset of controllers are being upgraded. Only after the subset of controllers have been fully upgraded to the new version does the method use the upgraded controllers to manage the forwarding elements. In some embodiments, the method only switches to the new version of the network control applications when a majority of the controllers has been fully upgraded to the new version. To minimize interaction between different versions within the controllers, each controller (also referred to as a controller node herein) is only responsible for the network control applications associated with its version.

The method of some embodiments uses a phased process with the upgraded network control applications to generate the network state on the controller nodes. The controllers use fixed point mechanisms to ensure that the process reaches a good state within each phase in order to coordinate the upgrade of the controller cluster. The controllers of some embodiments push the generated network state to the physical forwarding elements to implement the logical forwarding elements.

The method of some embodiments utilizes an upgrade coordinator (UC) that manages the upgrade of the controller nodes in a controller cluster. The UC requests that a subset (including up to, but no more than half) of the controller nodes prepare to be upgraded to a new version of the network control applications. The controller cluster ensures API requests directed to controller nodes that are being upgraded are automatically redirected to the old controller nodes that are not yet being upgraded. Once the UC determines that the subset of controller nodes has completed the upgrade, the UC requests that a decisive controller node upgrade to the new version. When the decisive controller node is upgraded, the network control cluster automatically switches over to using the new version of the network control application. API requests directed at the old nodes in the control cluster are automatically redirected to the new version of the control cluster. The UC then upgrades the remaining controller nodes.

In some embodiments, the method handles controller failures based on the failed controller node and the current state of the upgrade. The method of some embodiments determines whether a failed controller node is a part of a majority subset or a minority subset, and, based on the determination, either accelerates or aborts the upgrade.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for upgrading a set of controllers in a controller cluster in a way that minimizes dataplane outages. Such upgrades are needed from time to time as new versions of the controllers become available. In some embodiments, the controllers are part of a network control system that manages forwarding elements. The forwarding elements forward data between several computing devices (or hosts), some or all of which execute one or more virtual machines (VMs). The controllers in some embodiments execute a set of network control applications in order to manage sets of logical and physical forwarding elements. In some embodiments, the controllers use the set of network control applications to implement a set of logical forwarding elements on the physical forwarding elements.

Figure 1:
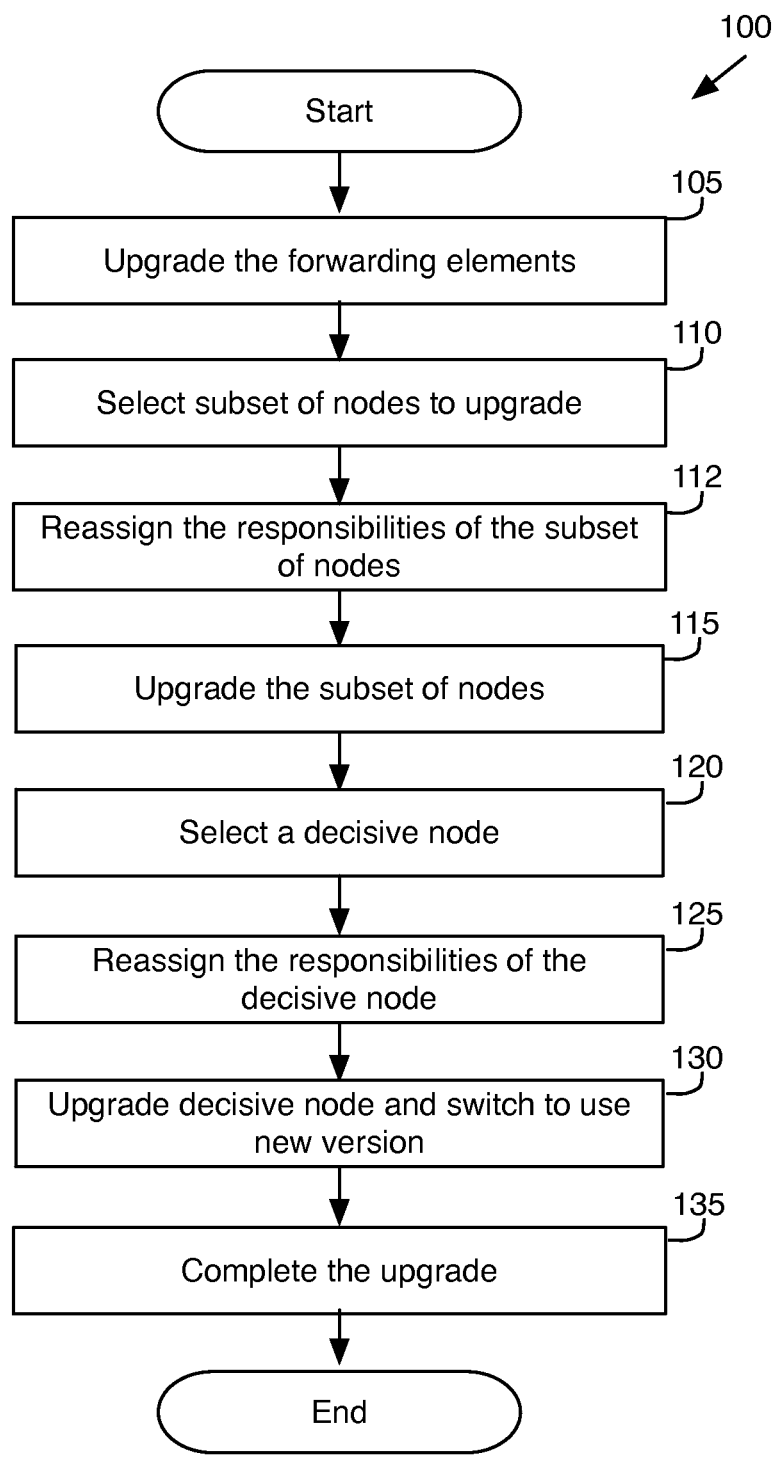
FIG. 1 conceptually illustrates a process for upgrading a network control system.

FIG. 1 conceptually illustrates a process for upgrading a network control system. In some embodiments, the process 100 is performed by an upgrade coordinator (UC) that orchestrates the upgrade of the controller cluster and forwarding elements. The process 100 will be described by reference to FIGS. 2A-B, which illustrate in eight stages 201-208 an example of an upgrade of a subset of controller nodes.

The process 100 begins when the process 100 upgrades (at 105) the physical forwarding elements in the system. This initial upgrade prepares the forwarding elements to be compatible with the upgraded version of the network control system. The new version of the network control applications may require new features on the forwarding elements that are only available in a newer version of the forwarding element. The UC controller of some embodiments upgrades the forwarding elements to enable the new features used by the new version of the network control applications.

Figure 2A:
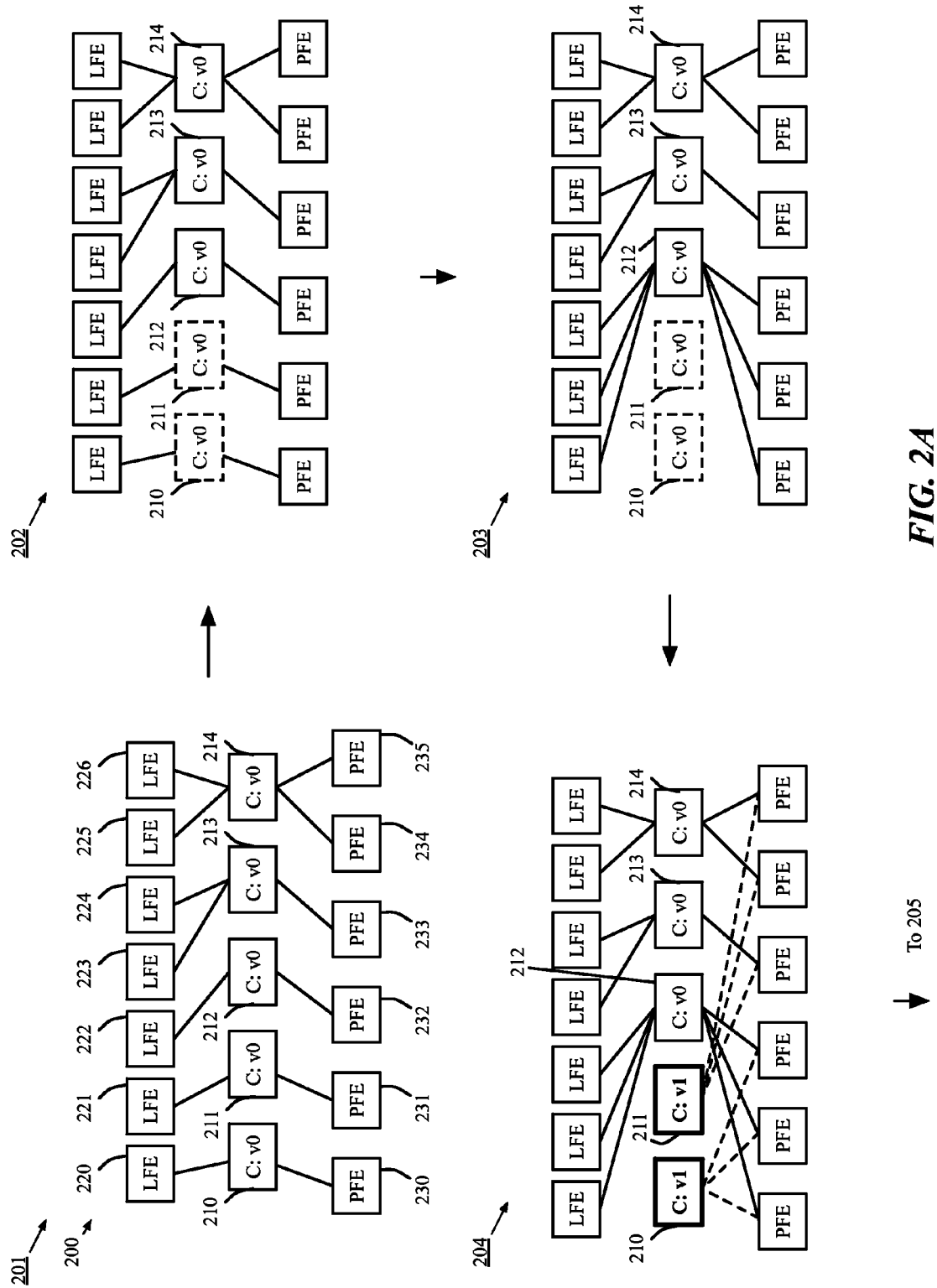
FIGS. 2A-B illustrate an example of upgrading a network control system.

Stage 201 of FIG. 2A shows an example of a network control system 200 that includes five controllers 210-214 for managing seven logical forwarding elements (LFEs) 220-226, and six physical forwarding elements (PFEs) 230-235. All of the controllers 210-214 are currently running the same version (v0) of the network control applications.

The LFEs and PFEs represent forwarding elements that describe the forwarding of data packets received at the forwarding elements. The LFEs are logical forwarding elements (or logical datapath sets) that represent logic for a forwarding element. The logic of the LFEs are then implemented on the PFEs, which are physical forwarding elements that receive and forward data packets. The separation of the LFEs from the PFEs allows a user to design an LFE to run on a set of PFEs. It is important to note that the physical forwarding elements are not necessarily implemented in hardware. PFEs of some embodiments are implemented in software.

Each controller node may have multiple responsibilities. For example, as seen in stage 201, each controller is responsible for both a set of LFEs and a set of PFEs. Although each forwarding element is shown as being assigned to one controller, in some embodiments the management of a forwarding element may be shared between two controllers, with one controller serving as a master and another serving as a standby, or backup. In addition, within the controllers, different controllers may serve different roles. For example, some controllers manage the logical elements of the network state, while other controllers manage the physical state. The network control system will be described in further detail below in Section I with reference to FIG. 3.

Returning to FIG. 1, the process 100 then selects (at 110) a subset of the controller nodes to upgrade. The subset of controller nodes in some embodiments includes up to, but no more than half (N/2) of the controller nodes (N). By using no more than half of the controller nodes, the process is able to maximize the computing resources available to both the new and old versions of the controllers (with a slight bias towards maintaining the old version). In some embodiments, the process 100 selects standby (or backup) controllers from the controller cluster to initially be upgraded to the new version. Alternatively or conjunctively, the process 100 selects controllers with fewer responsibilities that can be easily reassigned to other controllers. The process of some embodiments randomly selects the subset of controller nodes.

In the example of FIG. 2A, stage 202 illustrates the selection of controllers 210 and 211 to be upgraded to the new version. In this example, none of the controllers were standby controllers, but the process 100 selects controllers 210 and 211 because each controller is only responsible for a single LFE and a single PFE.

The process 100 then reassigns (at 112) the responsibilities of the selected controller nodes in the subset. The responsibilities of a particular controller node in some embodiments include managing logical and physical forwarding elements. Stage 203 illustrates that LFEs 220 and 221 and PFEs 230 and 231, which were managed by the selected controllers 210 and 211, have been reassigned to controller 212. In some embodiments, the remaining controllers perform various processes to assign responsibilities, such as electing master controllers and balancing responsibilities among the remaining controllers.

Once the responsibilities for the subset of controller nodes have been reassigned and the forwarding elements are being managed by the non-upgrading subset, the process 100 upgrades (at 115) the network control applications on the subset of controller nodes. Upgrading the network control applications in some embodiments allows the upgraded controller nodes to generate a new version of the network state that implements the logical forwarding elements on the physical forwarding elements. The controllers then push the generated network state to the physical forwarding elements. The update of the network state on the forwarding elements will be described in further detail below in Section IID with reference to FIGS. 6 and 8. Once the upgrade is complete, although the physical forwarding elements have now been updated with the new version of the network state (along with the old version of the network state), the new version is not yet active. Stage 204 illustrates that controllers 210 and 211 have been upgraded to the new version (v1) of the network control applications and are pushing the generated network state to the physical forwarding elements 220-226 and 230-235 (illustrated with dashed lines).

Figure 2B:
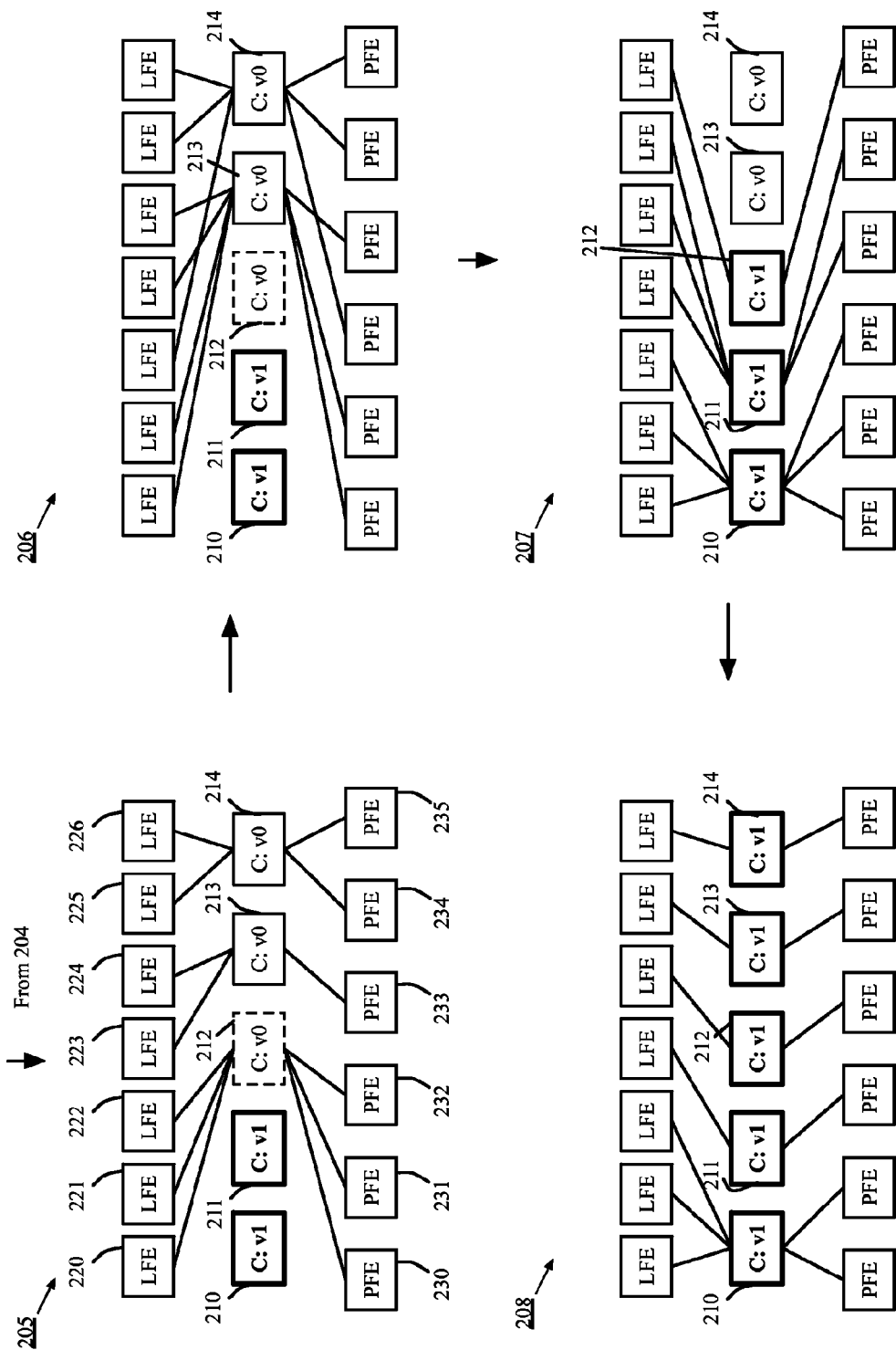

Once all of the controller nodes in the selected subset have completed the upgrade and pushed the new network state to the physical forwarding elements, the process 100 then selects (at 120) a decisive controller node. After the upgrade of the decisive controller node, the majority of the controller nodes will have the new version of the network control applications. In some embodiments, the criteria for selecting the decisive controller node is similar to the criteria used to select the subset of controller nodes at step 110 of FIG. 1. Stage 205 of FIG. 2B illustrates that controller node 212 has been selected as the decisive controller node. Once controller node 212 is upgraded, the majority (i.e., 3 out of 5) of the controller nodes will be running the new version (v1), and the system will be ready to switch to the new version.

Like the subset of upgraded controller nodes, the process 100 reassigns (at 125) the responsibilities of the decisive controller node. In some embodiments, the process selects a decisive controller node before reassigning the responsibilities of the subset of controller nodes so that responsibilities of the subset are not assigned to the decisive node. Such embodiments ensure that the responsibilities of the subset of controller nodes are not reassigned twice (i.e., once to the decisive node and once away from the decisive node). Stage 206 shows that the responsibilities of decisive controller node 212 have been reassigned to controller nodes 213 and 214.

In some embodiments, the controller nodes perform a balancing when reassigning the responsibilities of the controller nodes in order to balance the responsibilities between the remaining controller nodes. This is illustrated in stage 206, which shows that LFEs 220 and 221 and PFEs 230 and 231 have been reassigned to controller node 213, while LFE 222 and PFE 232 have been assigned to controller node 214 in order to balance the load between controller nodes 213 and 214.

The process 100 then upgrades (at 130) the decisive controller node 212, which signals the network control system to switch to the new version of the network control applications. The upgraded controller nodes are used to manage the forwarding elements, and all packets entering the system are marked to use the new version. Stage 207 shows that the upgraded controller nodes 210-212 are managing all of the forwarding elements 220-226 and 230-235. The process 100 then completes the upgrade by upgrading the remaining controller nodes 213 and 214. Stage 208 illustrates that all of the controller nodes 210-214 have been upgraded to the new version and are managing the forwarding elements. In some embodiments, the management of the forwarding elements is redistributed and re-balanced as controller nodes complete their upgrades. In some of these embodiments, the responsibilities of the upgraded controller nodes do not correspond to the responsibilities of the controller nodes prior to the upgrade. As illustrated in the example of FIGS. 2A-B, the non-upgraded controller node 210 in stage 201 was responsible for LFE 220 and PFE 230, whereas the upgraded controller node 210 in stage 208 is responsible for LFEs 220-222 and PFEs 230 and 231.

An overview of the process for upgrading a network control system without causing a dataplane outage has been described above. Further details and examples of upgrading the network control system are described below. Specifically, Section II describes the process for upgrading the network control system in greater detail. Section III then describes some of the tools used to implement the upgrade of the controllers. Section IV then describes controller node failure management. However, before describing these additional examples, the environment in which some embodiments of the invention are implemented will be described below in Section I.

I. Environment

The following section will describe the environment in which some embodiments of the invention are implemented. In some embodiments, the network control system includes a controller cluster that is made up of one or more controllers. The controllers allow the system to accept logical datapath sets (LDPSs), or logical forwarding elements (LFEs), from users and to configure the physical forwarding elements (PFEs) to implement these LFEs. The controllers allow the system to virtualize control of the shared PFEs and the logical networks that are defined by the connections between these shared PFEs. The virtualized control prevents the different users from viewing or controlling each other's LDPSs and logical networks while sharing the same managed PFEs. Examples of such network control systems are described in U.S. Patent Publications 2013/0058356, 2013/0058228, and 2013/0103817. These publications are incorporated herein by reference.

Figure 3:
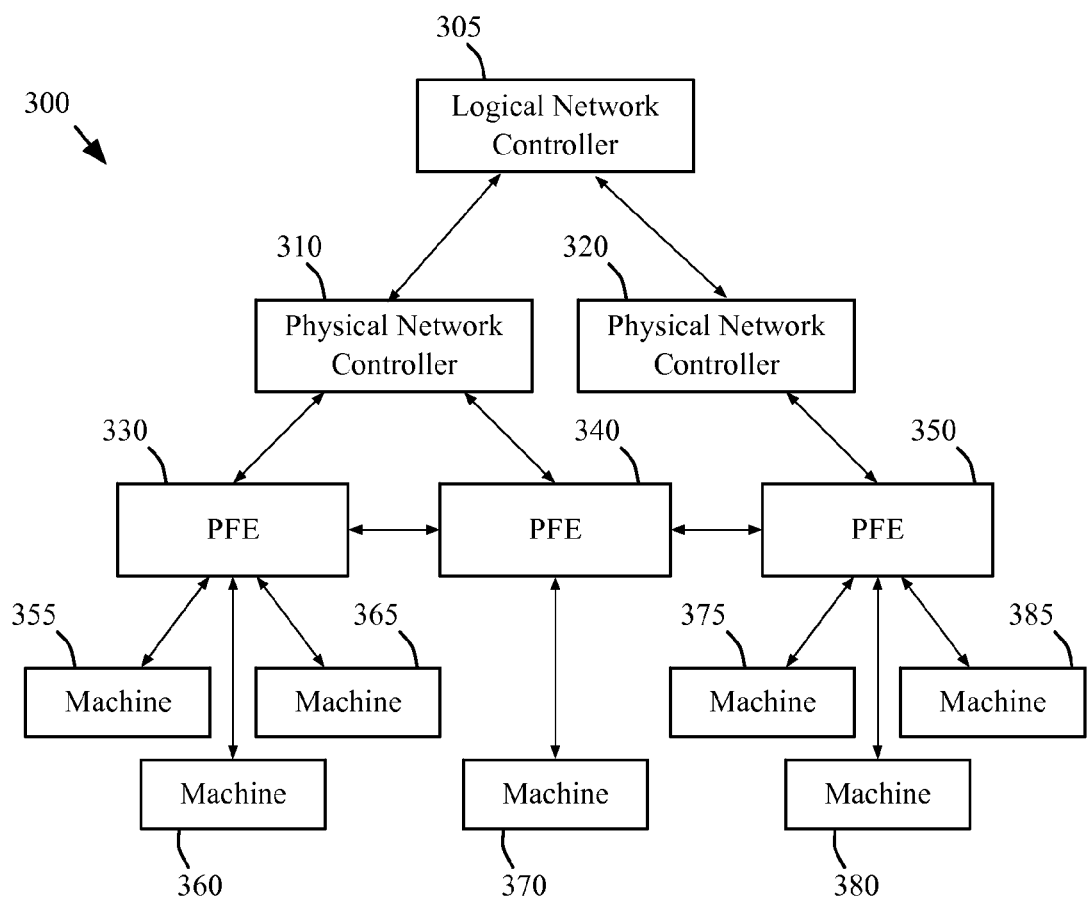
FIG. 3 conceptually illustrates an example architecture of a network control system.

FIG. 3 conceptually illustrates an example architecture of a network control system 300. In particular, this figure illustrates generation of customized physical control plane (CPCP) data from inputs by different elements of the network control system. As shown, the network control system 300 includes a logical controller 305, physical controllers 310 and 320, and three physical forwarding elements 330, 340, and 350. This figure also illustrates seven machines 355-385 that are connected to the physical forwarding elements 330, 340, and 350 to exchange data between them. One of ordinary skill in the art will recognize that many other different combinations of the controllers, switching elements, and machines are possible for the network control system 300.

The network control system of some embodiments includes different controllers to perform different tasks. In some such embodiments, the network control system includes different groups of controllers, with each group having different kinds of responsibilities. Some embodiments implement the different groups of controllers as a controller cluster in a dynamic set of physical servers. Thus, as the size of the deployment increases, or when a particular controller or physical server on which a controller is operating fails, the cluster and responsibilities within the cluster are reconfigured among the remaining active controllers. In order to manage such reconfigurations, the controllers in the cluster of some embodiments run a consensus algorithm to determine a leader controller. The leader controller partitions the tasks for which each controller instance in the cluster is responsible by assigning a master controller for a particular work item, and in some cases a hot-standby controller to take over in case the master controller fails.

As illustrated in FIG. 3, the logical controller 305 is responsible for a particular LDPS. The logical controller 305 of some embodiments thus generates universal physical control plane (UPCP) data from logical control plane (LCP) data that is generated based on user inputs. Specifically, the control module (not shown) of the logical controller 305 generates logical forwarding plane (LFP) data from the generated LCP data and a virtualization module (not shown) of the logical controller 305 generates the UPCP data from the LFP data.

The logical controller 305 identifies the master physical controllers of the physical forwarding elements that implement the LDPS. In this example, the logical controller 305 identifies the physical controllers 310 and 320 because the physical forwarding elements 330, 340, and 350 are configured to implement the LDPS. The logical controller 305 sends the generated UPCP data to the physical controllers 310 and 320.

Each of the physical controllers 310 and 320 can be a master of one or more physical forwarding elements. In this example, the physical controller 310 is the master of two physical forwarding elements 330 and 340 and the physical controller 320 is the master of the physical forwarding element 350. As the master of a set of physical forwarding elements, the physical controllers of some embodiments generate, from the received UPCP data, CPCP data specific for each of the physical forwarding elements. Therefore, in this example, the physical controller 310 generates the physical control plane data customized for each of the physical forwarding elements 330 and 340. The physical controller 320 generates physical control plane data customized for the physical forwarding element 350. The physical controllers send the CPCP data to the physical forwarding elements of which the controllers are masters. In some embodiments, multiple physical controllers can be the masters of the same physical forwarding elements.

In some embodiments, controllers of the network control system use Openflow to communicate with the physical forwarding elements. In some of these embodiments, the role request function for determining the role of a particular controller is not used. Rather, each controller determines if it is the master and steals mastership back if it is determined to be the master.

In addition to sending CPCP data, the physical controllers of some embodiments receive data from the physical forwarding elements. For instance, a physical controller receives configuration information (e.g., identifiers of VIFs of a physical forwarding element) of the physical forwarding elements. The physical controller maintains the configuration information and also sends the information up to the logical controllers so that the logical controllers have the configuration information of the physical forwarding elements that implement the LDPSs of which the logical controllers are masters.

Each of the physical forwarding elements 330, 340, and 350 generates physical forwarding plane (PFP) data from the CPCP data that the physical forwarding element received. As mentioned above, the PFP data defines the forwarding behavior of the physical forwarding element. In other words, the physical forwarding element populates its forwarding table using the CPCP data. The physical forwarding elements 330, 340, and 350 forward data among the host machines 355-385 according to the populated forwarding tables.

The architecture 300 described in FIG. 3 is only one example of a network control system. It should be apparent to one skilled in the art that the invention is not limited to the described network control system. In some embodiments, the roles performed by the different layers of the network control system may vary. In addition, some embodiments of the network control system may include more or fewer layers of processing. For example, in some embodiments, the network control system includes a chassis controller that processes data from the physical controllers before passing it to the forwarding elements.

As mentioned above, the network control system of some embodiments also provides an upgrade coordinator that manages an upgrade of a controller cluster by coordinating the upgrade of the individual controller nodes. The upgrade coordinator of some embodiments upgrades controller nodes of a controller cluster to a new version of network control applications in a number of phases designed to minimize dataplane outages in the system. The upgrade process will be described in further detail in Section II below.

II. Process for Upgrading a Controller Cluster

A. Upgrading the Forwarding Elements

Upgrading a controller cluster begins by upgrading the physical forwarding elements to allow the forwarding elements to use new features that are available in the new version of the network control applications that is being upgraded on the controllers. The method of some embodiments upgrades the kernel module and user space components of the forwarding elements. In some embodiments, the kernel is the most basic component of an operating system that runs on a separate memory space and is responsible for managing system resources (e.g., communication between hardware and software resources). In contrast, the user space is a memory space where all user mode applications may run.

The forwarding elements of some embodiments are Open vSwitch (OVS) switching elements, and upgrading the forwarding elements involves installing a new Nicira Upgrade Bundle (NUB), which triggers an upgrade of all OVS user space and kernel binaries. The process of some embodiments hot swaps (e.g., with the kmod reload command) the new kernel module into the kernel.

B. Upgrading the Subset of Controller Nodes to a New Version

Figure 4:
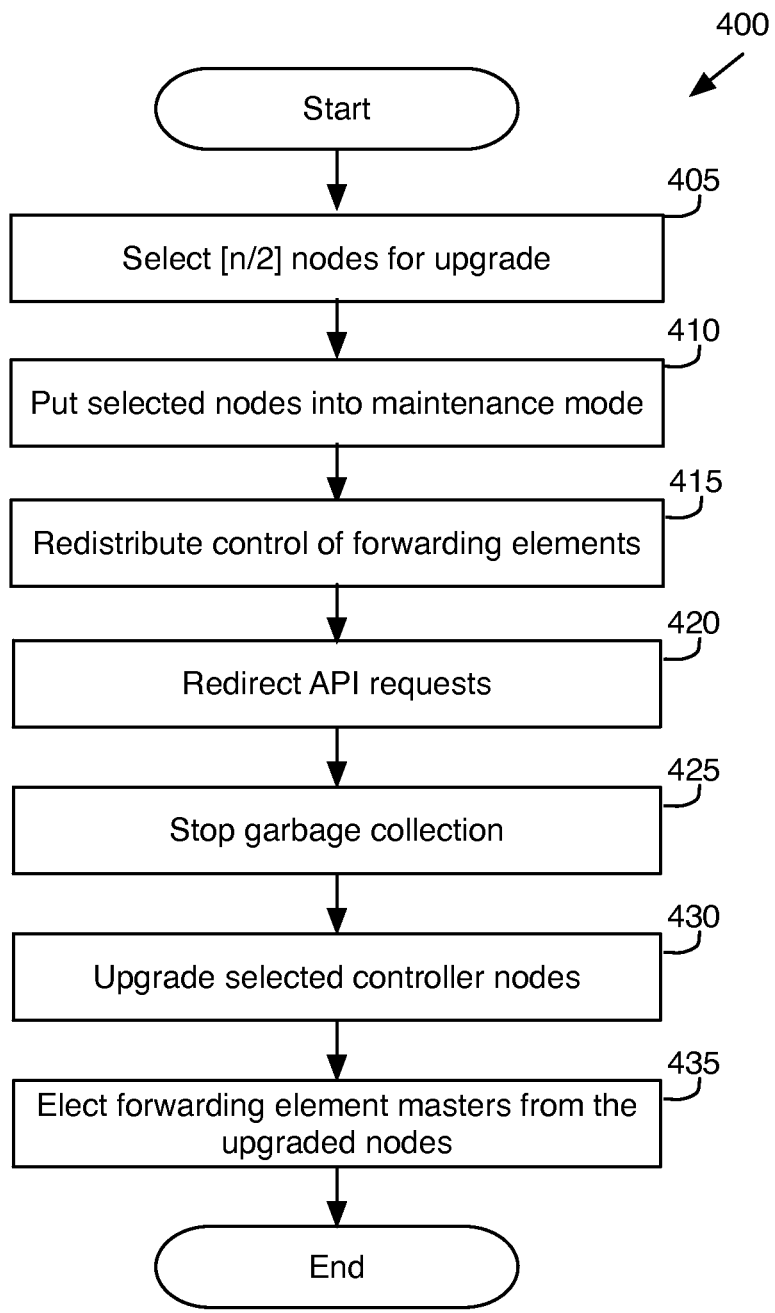
FIG. 4 conceptually illustrates a process for upgrading a subset of controller nodes to a new version.

Once the physical forwarding elements have been upgraded, the method upgrades a subset of controller nodes in the controller cluster to a new version of the network control applications. FIG. 4 conceptually illustrates a process 400 for upgrading the subset of controller nodes to a new version. In some embodiments, the process 400 is performed by the UC controller and begins when the UC controller receives a request to upgrade the network control applications of the controller cluster. The process 400 will be described by reference to FIGS. 5A-B, which illustrate in four stages 501-504 the upgrade of a subset of controller nodes.

The process 400 of FIG. 4 begins by selecting (at 405) $\lfloor n/2 \rfloor$ controller nodes (where n is the number of controller nodes in the controller cluster) for upgrade. The $\lfloor n/2 \rfloor$ (i.e., a max minority) controller nodes include up to, but no more than half of the controller nodes so that the selected controller nodes make up a minority of the controller nodes and the remaining controller nodes remain the majority until the upgrade is completed. In some embodiments, the process 400 selects the $\lfloor n/2 \rfloor$ controller nodes by identifying non-master controller nodes in the controller cluster. In other embodiments, the UC controller selects controller nodes based on different criteria.

The process 400 selects (at 405) a max minority of the controller nodes because once the new controller nodes are upgraded, the network control system will be running both the old and new versions of the network control applications until the system can switch to the new version. The total state at this point (in particular flows) is expected to be close to twice the single version state because the total state includes both the old and new versions of the state. Since multiple, different versions of the network control applications will be running, the system will not be able to preserve the same number of standbys. In order to counter the increased state, the process reduces the number of standby controllers, and uses those controllers as masters to run the new version of the network control applications.

In some embodiments, some of the controllers may be implemented in software on a host device. In some such embodiments, rather than only selecting existing controller nodes, the process instantiates an additional controller instance. The additional controller instance operates on the same host device as the existing controller instance, providing similar services as the existing controller instance, but using a new version of the network control applications.

Figure 5A:
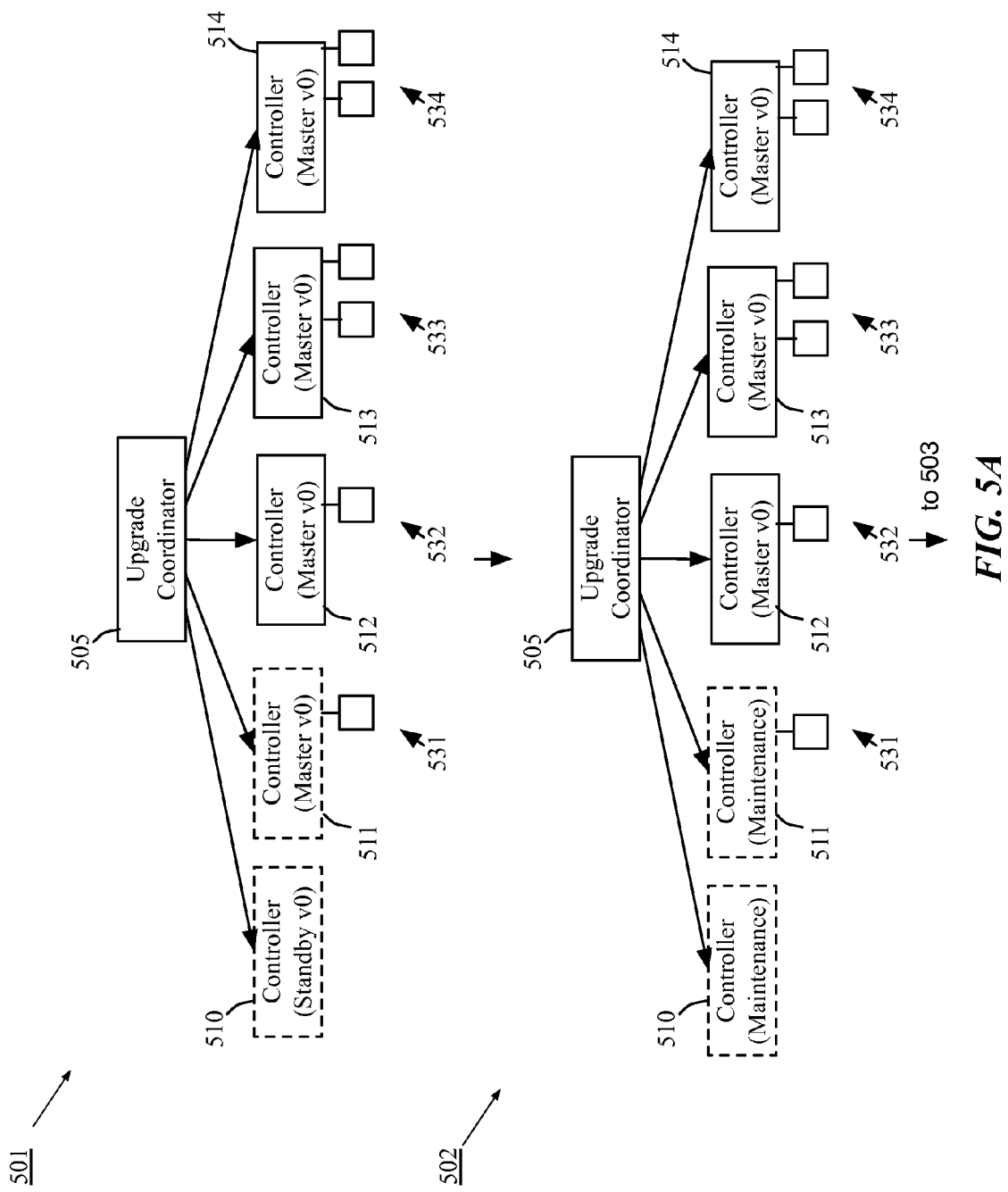
FIGS. 5A-B illustrate an example of an upgrade of a subset of controller nodes.

The first stage 501 of FIG. 5A illustrates a network control system that includes an upgrade coordinator 505 with a set of controllers 510-514. Controller 510 is designated as a standby controller, ready to serve as a backup in case one of the master controllers fails. Controllers 511-514 are master controllers for sets of forwarding elements 531-534, respectively. The sets of forwarding elements 531-534 may include physical forwarding elements, logical forwarding elements (or LDPSs), or both physical and logical forwarding elements. All of the controllers 510-514 are running the same version (v0) of the network control applications.

In the first stage 501, the upgrade coordinator 505 has selected controllers 510 and 511 (indicated by dotted lines). In some embodiments, the process 400 selects all of the standby (backup) controllers for the upgrade process. Alternatively or conjunctively, the process 400 selects controllers based on other factors, such as the number of forwarding elements or LDPSs for which a particular controller is a master. In this example, the process 400 selects controller 510 because it is a standby controller and controller 515 because it is a master of no more forwarding elements than any of the other controllers 512-514.

The process 400 then puts (at 410) the selected controller nodes into maintenance mode. Maintenance mode is an API mode available to the upgrade coordinator to indicate an intent to upgrade a controller node. In some embodiments, the selected controller nodes may still be controllers that are standby (or backup) controllers for one or more logical or physical forwarding elements. The process ensures that no more than $\lfloor n/2 \rfloor$ of the controller nodes are moved into maintenance mode.

The goal of maintenance mode in some embodiments is to allow the UC controller to communicate the list of controller nodes that are going to be upgraded to the controllers. The UC controller also verifies that the controllers are working properly as they are moved into maintenance mode. Failure of at least one controller node during the upgrade must be tolerated as far as possible. In the unlikely event that the UC controller determines that a controller node has failed to enter maintenance mode after a specified wait period, necessary information (e.g., the queue length, etc.) will become available through debug counters in order for the user to debug the system. The second stage 502 illustrates that the selected controllers 510 and 511 have been put into maintenance mode, indicating that they are to be upgraded to the new version of the network control applications.

Once the selected controller nodes have been put into maintenance mode, the process 400 prepares the selected controller nodes for upgrade. The process 400 redistributes (at 415) control of LDPSs and forwarding elements among the old-version controllers, assigning a master controller in the old system for each logical and physical forwarding element in order to ensure the uninterrupted management of the forwarding elements. Based on the list of controller nodes in maintenance mode, the process re-assigns the duties of the controller nodes in maintenance mode to controller nodes that are not in maintenance mode. Such duties may include serving as a master for a set of physical forwarding elements and/or serving as a master controller for a particular logical datapath set (LDPS). In some embodiments, the controller cluster automatically re-assigns duties among the remaining controller nodes that are not in maintenance mode through a master election process. In the master election process, masters for the forwarding elements or LDPSs are selected from the available (i.e., not in maintenance mode) controller nodes.

According to some embodiments, redistribution of the duties of the LDPSs and forwarding elements is done implicitly. Some of these embodiments use a coordination manager that is executed on the controller cluster. The coordination manager automatically distributes the duties among the controller nodes of the controller cluster whenever a controller node becomes unavailable (e.g., a controller fails, is taken offline, or is moved into maintenance mode).

Figure 5B:
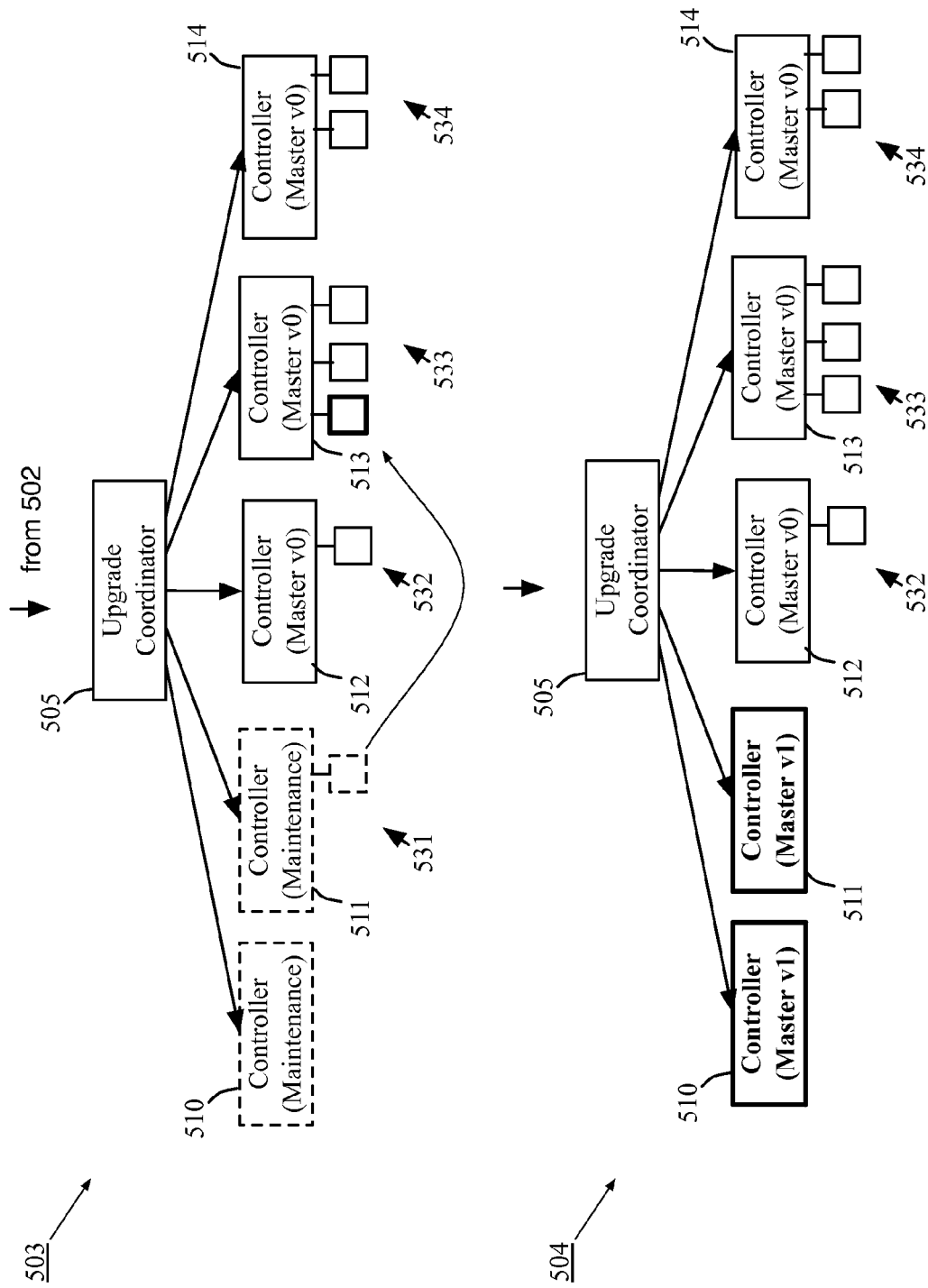

The third stage 503 of FIG. 5B shows that the forwarding element 531, for which selected controller 511 was the master, has been reassigned to controller 513. In this example, the forwarding element 531 may represent a physical forwarding element, a logical forwarding element, or both. As described above, in some embodiments a decisive node is selected before reassigning the responsibilities of the controllers. In the illustrated example, controller 512 is selected as the decisive node, so the responsibilities of the selected controller 511 were reassigned to controller 513 rather than controller 512, even though controller 512 manages fewer forwarding elements.

After the process redistributes (at 415) control of the forwarding elements, the subset of controller nodes that are not in maintenance mode (i.e., the controller nodes running the old version of the network control applications) will have one master and one standby for each LDPS and forwarding element in some embodiments. The network control system of other embodiments will continue to operate with no standby controllers while the selected controllers are upgraded.

In addition to re-electing masters for forwarding elements and LDPSs, the process 400 redirects (at 420) all the API requests headed to a controller node selected for upgrade to an old-version controller node. The controllers running the old version of the network control applications will continue to handle the API requests during the upgrade, so long as the old version continues to run in a majority of the controller nodes. API requests need to be handled as they would be during the regular cluster operations. To do this, the controller cluster of some embodiments redirects API requests to the old-version controller nodes. Some operations (e.g., logical controller to physical controller forwarding, etc.) are isolated within a given controller version and hence run the same code as normal operation. Hence, API requests that arrive at a new-version controller node need to be redirected to a controller node that is executing the old version of the network control applications. However, in some embodiments, debug API requests that modify configuration parameters (which the upgrade depends on) are not redirected. Rather, these debug requests use the read-only passthrough option to avoid being redirected.

The process 400 then stops (at 425) garbage collection during the upgrade so that multiple versions of forwarding state (e.g., openflow and config database) can exist on the forwarding elements at the same time. In some embodiments, rather than stopping all garbage collection, the process only stops garbage collection for one of the versions of the network control applications running on the controller nodes. Some of the described steps of process 400 are not shown in the four stages of FIG. 5.

Once the controller nodes have been prepared for the upgrade, the process 400 upgrades (at 430) the controller nodes that are in maintenance mode. When the upgrades are complete, the process 400 elects (at 435) a new set of masters for the forwarding elements from the newly upgraded controller nodes. The fourth stage 504 shows the selected controllers 510 and 511 after the network control applications on the controllers have been completely upgraded to the new version (v1). In this example, the upgraded controllers 510 and 511 are not yet assigned control of any of the forwarding elements.

The coordination manager will enter a new mode where it will do a simple round-robin with the other controller nodes in the new version to ensure that each LDPS and forwarding element has a master in the new version and that there are no standby controllers. These elected masters do not take the place of the existing masters from the old-version controller nodes. Until the system is ready to switch to the new version, the old-version controller nodes will continue to manage the forwarding elements and the newly elected masters simply prepare and push the new version of the data for the forwarding elements. This allows for the computation of the forwarding state in both versions. The cluster will remain in this state until the cluster stops being busy.

The total state at this point (in particular flows) is expected to be close to twice the single version state because the total state includes both the old and new versions of the state. Each flow is associated with a controller version. Multiple versions of the network control applications may co-exist, so to minimize interaction between different versions within controllers, each controller node is only responsible for the network control applications associated with its version.

C. Phased Generation of the Network State on the Controller Nodes

Once the new-version controllers have been upgraded, they can begin to generate new network state data for the forwarding elements. The forwarding data upgrade occurs in a few distinct phases. Some embodiments use fixed point mechanisms with the new set of controller nodes to ensure that the process reaches a known good state within each phase. Each controller node goes through all these phases. In some embodiments, the transition of control controller nodes through these phases is orchestrated from a centralized location (ideally in the UC controller). The upgrade process implements various features in order to provide fixed points while upgrading the controllers in different phases.

1. Fixed Point Mechanisms

Fixed point is a runtime API to allow clients to request that the controller computation be quiesced. The controller exposes a wait_fixedpoint API that blocks, or waits, until a fixed point is reached given the set of currently queued artifacts (i.e., until all the computation is done, given the list of input (e.g., data tuples) already queued).

In some embodiments, each controller has an outer (or main) input queue and an inner queue. The outer queue is frozen when a fixed point is requested. Unlike outer queues, input fed in through inner queues will continue to be evaluated. The inner queue is only to be used to queue input that is notionally internal for the fixed points evaluation but rely on state from the external world. Output tables (e.g. compression tables) with special needs may also use the inner queue to feed in further input for evaluation.

Some embodiments provide a Drainable output table interface for output tables that are special and require external state to be re-consumed for evaluation during fixed point computation. The fixed point implementation will wait on Drainable output tables to be drained along with evaluating all the inputs enqueued in the inner queue. The implementation of the wait interface needs to make sure that 1) all the inputs/outputs have been processed, 2) the secondary inputs are queued in the inner queue, and 3) all secondary inputs to be evaluated have arrived.

All output tables that implement the fixed point API should implement the Drainable output table interface. In some embodiments, there are three categories of output tables that implement fixed points, (1) blocking external output tables, (2) simple input/output tables, and (3) config stack related output tables.

Blocking external output tables wait on output tuples until they have been fully processed. An example would be the phys switch flow table which waits on callbacks (e.g., from an openflow sync) from switches. For blocking external output tables, the wait interface needs to make sure that all the inputs/outputs have been processed.

Simple input/output tables have outputs that trigger inputs to be considered for further evaluation. Examples of these tables include compression tables and ctxt allocation tables. In this case the output table adds the new inputs to the secondary queue for further evaluation. For simple input/output tables, the wait interface needs to make sure that the secondary inputs are queued in the inner queue to be processed.

Config stack related output tables are slightly different from traditional output tables in that just the presence of tuples in the tables signal pending work, so the table will be considered drained only once it is empty. It empties out when the new data from its drained transactions are imported into controller computation engine(s) and thus cancel out the need for those changes to be made. For example, a tuple to create a desired port will exist in the table until the port has been successfully created and imported into controller computation engine(s) (which in some embodiments are the nlog table mapping engines described in the above-incorporated U.S. Patent Publications 2013/0058356, 2013/0058228, and 2013/0103817). Transactions in a configuration database (e.g., OVSDB) can also produce new data that needs to be processed before the fixed point is achieved. An example would be the tunnel port number for tunnels that the controller creates. The port number is needed to create tunnel flows. The config stack output table will only be marked as completely drained once the port has been imported into controller computation engine(s), so that this new information will be added to the inner queue before returning from the drain interface.

Remote Procedure Call (RPC) tables are a special category of tables, and need some orchestration for fixed point to work correctly. The runner will trigger a barrier call implemented by all drainable tables when a fixed point is reached. The barrier for the RPC will carry the generation number over to the subscriber side. This generation number helps to identify all the computation sent over by the publisher that is required by the subscriber for its own fixed point computation. An out of band mechanism will convey the generation number to the controller node on the subscriber side of the barrier. The subscriber table will block the fixed point on its local controller until it receives the barrier from the publisher for the generation number communicated by the out of band mechanism.

2. Phases for Generating Network State Data

Figure 6A:
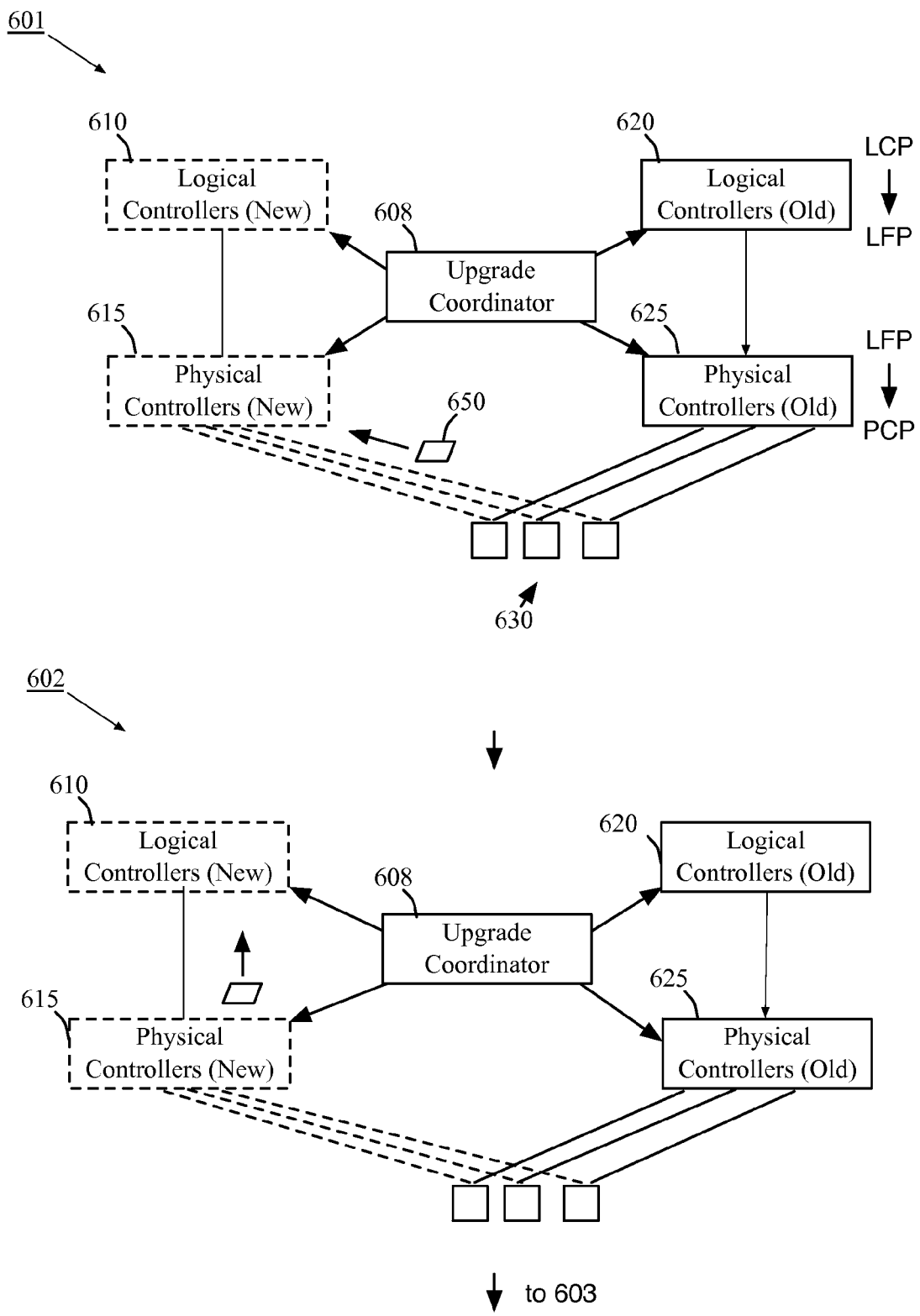
FIGS. 6A-B illustrate the upgrade of the controller nodes of the new-version controllers can be orchestrated through five phases from a centralized location.
Figure 6B:
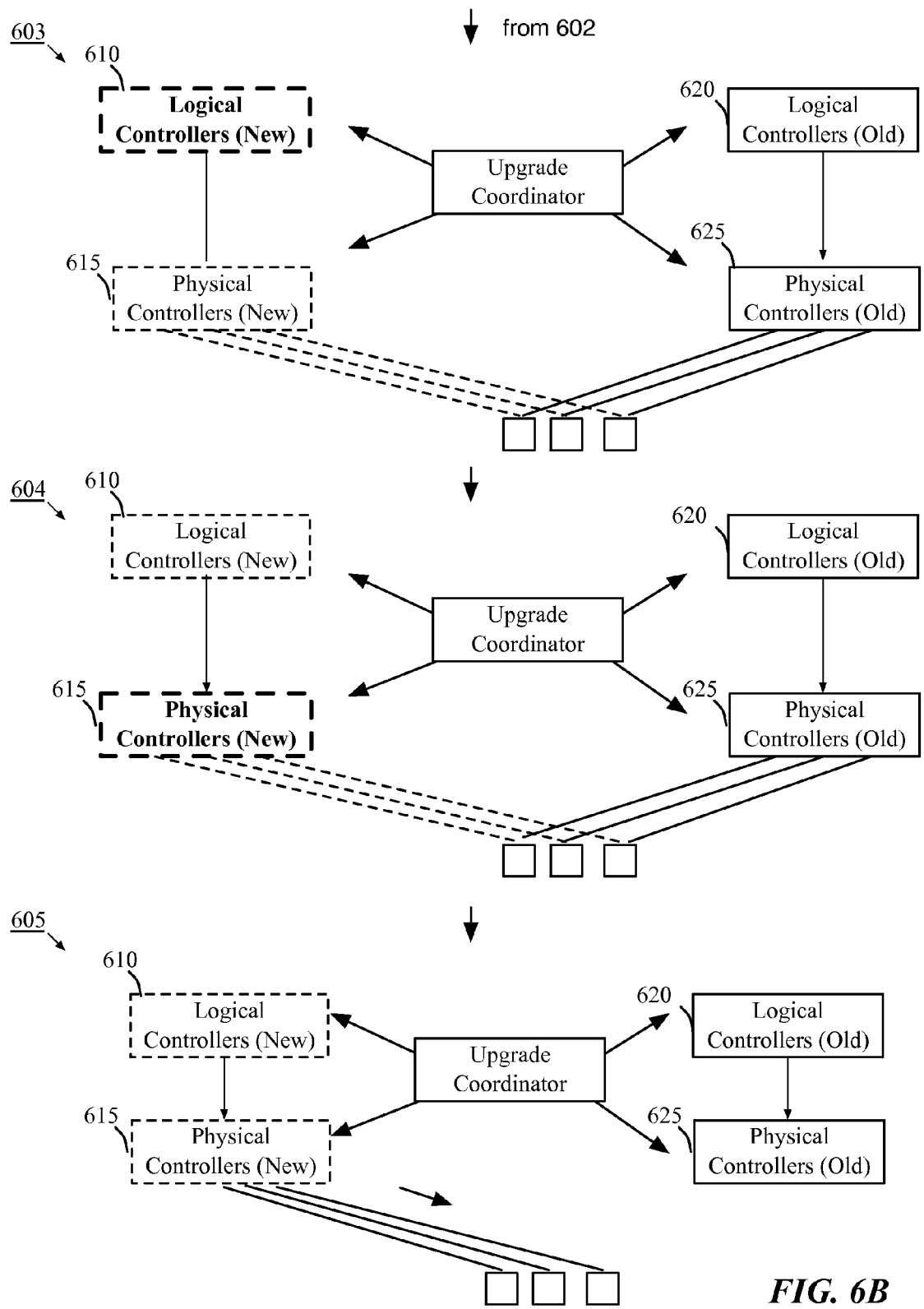

Using the fixed point mechanisms described above, the controllers of the network control system generate new network state data. FIGS. 6A-B illustrate that the generation of network state data can be orchestrated through five phases 601-605 from a centralized location (e.g., the UC controller). The first phase of 601 of FIG. 6A illustrates a portion of a network control system that includes an upgrade coordinator 608, logical controllers 610 and 620, physical controllers 615 and 625, and physical forwarding elements 630. Logical controllers 610 and physical controllers 615 have been upgraded to the new version of the network control applications, while logical controllers 620 and physical controllers 625 are still running the old version of the applications. The upgrade coordinator 608 controls all of the controllers 610-625 in order to manage the forwarding elements 630.

In the first phase 601, the physical master controllers 615 (with the new version of the network control applications) wait for all of the physical forwarding elements to connect. The UC controller 608 of some embodiments determines the wait time based on the total number of physical forwarding elements connected to the old set of controller nodes 620 and 625 as an indicator of the number of forwarding elements that need to be connected. The physical master controllers 615 then read all the state 650 that is required for logical computations (e.g., iface→location mapping, mac addresses, etc.). In some embodiments, a maximum timeout period is used when the physical forwarding elements take too long to respond.

Meanwhile, the old physical master controllers 620 and the old logical master controllers 625 manage the forwarding elements 630. The logical master controllers 620 perform the necessary logical computations while the physical controllers 625 perform the necessary physical computations. The controllers 620 and 625 manage the implementation of LFEs on the PFEs through this conversion between the logical and physical dataplane information.

In the second phase 602, the physical master controllers 615 broadcast the data 655 collected in the first phase to all or to only a subset (e.g., the master controllers) of the logical controller nodes 610. Only physical data collected by the physical master controllers is input into the controller computation engine(s) in this phase. The UC controller 608 requests a barrier from the physical master controllers 615 after all of the physical forwarding elements have connected. This will trigger a barrier request being sent from all of the physical masters 615 to all of the logical masters 610. The physical masters 615 are publishers of the barrier request to the subscribers, the logical masters 610. The physical masters 615 communicate markers indicating the end of a transmission (e.g., generation numbers) to the UC controller 608.

In the third phase 603 of FIG. 6B, the logical controllers 610 perform all of the necessary logical computations for the new version of the forwarding data. The UC controller 608 communicates the per publisher barrier generation number to each of the subscriber (i.e., logical) controllers. The generation numbers allow the logical controllers to know they are not done computing until they receive the generation number. The UC controller 608 then requests a fixed point. After the UC controller 608 requests a fixed point, the fixed point is reached after the per publisher barrier is received, and all the computation is done for the logical controllers 610. When the computation is completed, a barrier is sent from all the logical controllers 610 back to the physical controllers 615. At this point, the logical masters 610 are publishers to the physical masters 615. This barrier generation number is communicated to the UC controller 608.

In the fourth phase 604, the physical controllers 615 perform the necessary physical translations to convert the logical dataplane information to physical dataplane information for the new version of the forwarding data. The UC controller 608 communicates the per publisher generation number to each of the subscribers, physical controllers 615. A fixed point is requested, and the fixed point is reached when all of the translation computation is done and operations for tables (e.g., the openflow sync) have been called.

In the fifth phase 605, the network interfaces are migrated to the new version of the forwarding data. In some embodiments, the network interfaces are virtual interfaces (VIFs). This happens after the majority has moved to the new version (i.e., when the decisive controller node has been upgraded to the new version). The fifth phase 605 illustrates that the old controllers 620 and 625 no longer manage the forwarding elements 630 and the new controllers 610 and 615 have taken over the management of the forwarding elements. The VIFs resubmit to the new pipeline flows are written, since each of these flows are just a single flow, the transition from the old to new pipeline should be quick. In some embodiments, tuples are grouped by logical switch and intermediate fixed points are requested to ensure that the upgrade is performed on a per logical switch basis.

In some embodiments, the forwarding data is upgraded in a rolling manner, one VIF at a time. In such embodiments, features should assume a per-lport upgrade. Hence, in some embodiments, features that share state across lports not captured by the new forwarding data upgrade flows (e.g., learning flows shared between source and destination VIFs for a security profile) need to be backwards compatible. The new version of the forwarding data should be able to look up the learning state produced by the old version of the forwarding data. In addition, the API cannot be switched over to the newer version until all VIFs are updated.

D. Updating Data on the Forwarding Elements

Once the upgraded controller nodes of the controller cluster have generated the configuration and forwarding state data for the forwarding elements, the upgraded controllers push the data to the forwarding elements. The forwarding data (e.g., forwarding rules, flow based rules, etc.) effectuates the logical and physical forwarding in the forwarding elements. In some embodiments, the forwarding data includes flows and/or configuration data. In other embodiments, the forwarding data does not include flows.

Figure 7:
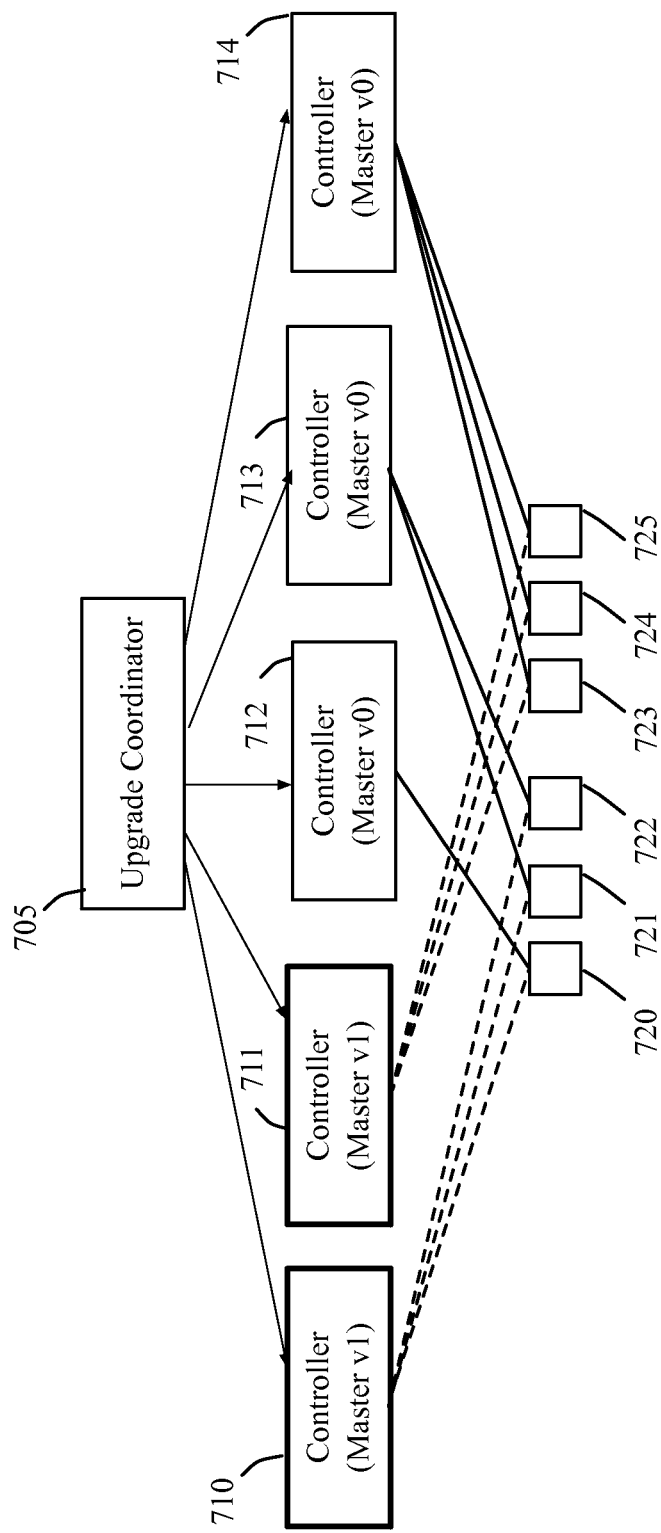
FIG. 7 illustrates the update of data on the forwarding elements.

Once the network state is updated on the new-version controller cluster, the new-version cluster of some embodiments updates packet control data and configuration data for the forwarding elements of the system by pushing the new version of the forwarding data to the forwarding elements. FIG. 7 illustrates the update of data on the forwarding elements. Similar to the fourth stage 504 of FIG. 5, this figure shows that the controller nodes 710 and 711 have been upgraded to the new version (v1) of the network control applications, but that forwarding elements continue to be managed by the controllers 712-714. In addition, new masters for the forwarding elements have been elected from among the upgraded controller nodes 710 and 711 (as indicated by the dotted lines). However, the forwarding elements 712-714 are still running the old version (v0) of the network control applications, as indicated by the solid lines. At this point, the controllers 710 and 711 running the new version (v1) of the network control applications are preparing data to be updated on the forwarding elements before pushing the data to the forwarding elements as described above with reference to FIG. 6.

In some embodiments, the controller cluster upgrades different sets of information on the forwarding elements (e.g., configuration data, packet control data, and the forwarding state). The configuration data includes data used to configure the switch itself (e.g., data for configuring ingress ports, egress ports, quality of service configuration for certain ports, etc.). The configuration data of some embodiments is stored in a configuration database on the forwarding elements. The packet control data controls the version bit used to control the flow of packets through the forwarding elements, providing rules for processing packets (e.g., setting the version bit on an incoming packet to specify which version of the forwarding state to use for a particular packet). The forwarding state describes the rules used to forward packets through the forwarding elements (e.g., forwarding packets with a certain destination address that are received on a particular port to a second, different port).

1. Updating the Configuration Data

The controller cluster of some embodiments upgrades the configuration data stored in a configuration database on each of the forwarding elements. Changes in the configuration data may include changes to the configuration of the forwarding element. The configuration of a forwarding element includes entities (e.g., ports, tunnels, etc.) and attributes of those entities (e.g., name, status, etc.). There are four possible differences in the state of multiple versions of the network control applications while upgrading the network control applications on the controllers of a network control system. By resolving and managing these differences, the network control system can push new versions of the configuration data to the forwarding elements without disrupting the old version.

The first difference arises when a certain attribute on an entity (e.g., a logical port) differs across versions, where the newer version adds the attribute for the entity. Second, there may be a different set of entities on newer versus older versions of the network control applications (e.g., new tunnels are created in a newer version that didn't exist in an older version). This difference doesn't necessarily have to be additive (i.e., the newer version doesn't have to be a superset of the older version).

In order to resolve these first two types of differences, each version of the network control applications annotates properties and entities with the controller version. Garbage collection is only allowed for entities/attributes owned by the specific version. In some embodiments, rather than annotating properties and entities with the controller version, the UC controller disables garbage collection so that multiple versions can co-exist on the controller node.

The third difference arises when a certain attribute of the entity exists in both the old and new versions, but the value is different (e.g., X=1 in the old version, but X=2 in the new version). An example would be stable names for tunnel ports. It is acceptable for the newer version to live with unstable names for a transitional phase. In some embodiments, the network control system updates the attributes that are different after the transition to the newer version. These updates have to be explicitly handled by the application layer as they are not a backward compatible change. These updates can be performed after the transition phase.

Finally, the fourth difference arises when there are conflicts between old and new versions for a given entity or an attribute. The old pipeline will require the old version and the new pipeline will need the new version. Similar to standard database schema upgrade procedures, in some embodiments, old properties are marked as deprecated and new properties are added. Newer implementations need to honor both properties being set, with reconciliation being done by the clients of the property.

In some instances, multiple controllers write to the same configuration database instance. In such instances, a cooperative locks implementation is used to manage writing to the configuration database instance.

2. Upgrading the Packet Control Data

The controller cluster of some embodiments also upgrades the packet control data on each of the forwarding elements. In some embodiments, this packet control data is represented as a series of flow entries that implement logical datapath sets in physical forwarding elements. With multiple versions of the forwarding data running on a forwarding element, the controller will submit a single flow matching on the version of the packet to the right set of forwarding element (e.g., OVS) tables. As different sets of tables are used for each version of the network state, the controllers for each of the multiple versions are syncing the state of different tables than the controllers for any of the other versions. Because the primary table is used by all the different versions, it is handled specially. In some embodiments, the application layer explicitly handles syncing the primary table (i.e., no garbage collection).

In some embodiments, the version of the network control applications running on a controller and its associated flows is identified by a version bit. Each flow matches on a version bit associated with the packet (carried in a global register). The version bit is a bit that is preserved for a hitless upgrade. The version bit is set at the VIF decode stage and added to the metadata of each encapsulated packet in some embodiments. The version bit indicates the version or generation of the flows that should be used to process each packet. The new flows will match on a different value for the version bit than the old flows. The version bit identifies the version of the packet pipeline to run the source, destination and intermediate ports. When the system is ready to be converted to the new version of the network control applications, the version bit in the metadata of the incoming encapsulated packets will be flipped to use the new version of the flows.

When a controller node is initialized, the controller node initially determines the version bit that is to be used by the controller node for the version running on the controller node. The controller node identifies the current version bit and the controller version persisted in the configuration database. If the controller version matches up with the current running version (e.g., determined by using a version function such as ApplicationConfig::application_version( )), the version bit of the controller is persisted. If the controller version does not match up with the current running version, the controller node queries another controller, and uses the version bit of the other controller if the other controller is using the same controller version. In some embodiments, when the other controller is using a different controller version, the controller performs a NOT operation on the version bit used by the other controller. In such an embodiment, only two versions can be running at a given controller node. With the new version pushed to the forwarding elements, and the new-version controller nodes upgraded, the process is ready to switch to the new version.

3. Updating the Forwarding State

In addition to updating the configuration data and packet control data on the forwarding elements, the controller cluster of some embodiments updates the forwarding state on the forwarding elements. Once the controller nodes have been completely upgraded, the upgraded controller nodes of some embodiments push the new version of the network state to the forwarding elements. The upgraded network state is stored on the physical forwarding elements along with the current version of the network state that is being managed by the old-version controller nodes. Controllers running both the old and new versions of the network control applications make changes to the tables in the physical forwarding element. The tables store the state of the network, so when the new-version controllers update the tables with the new version of the network state, the total state is expected to be roughly double the original state.

Figure 8:
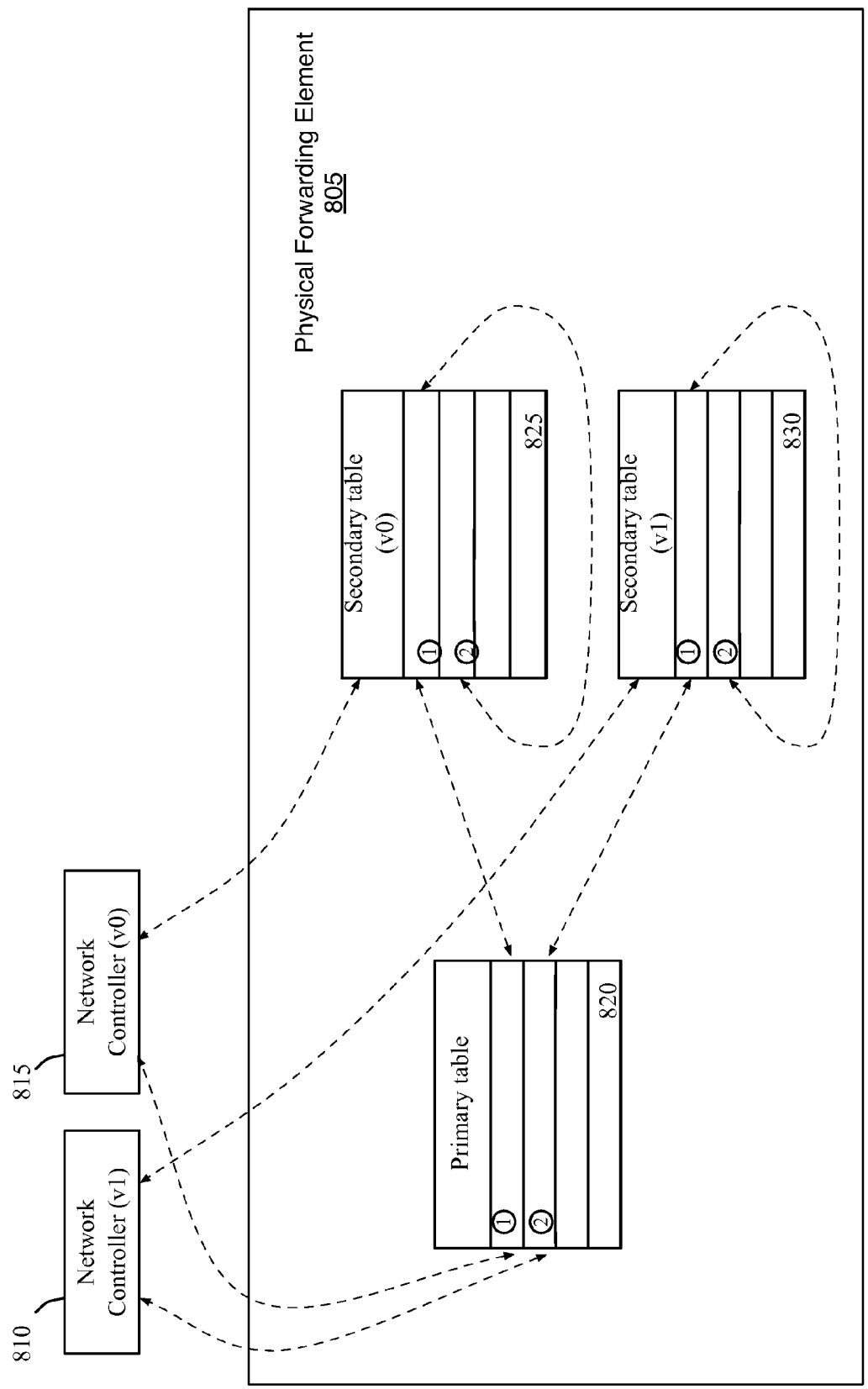
FIG. 8 illustrates an example of upgrading the forwarding state on the forwarding elements without interfering with the existing forwarding state.

FIG. 8 illustrates an example of upgrading the forwarding state on the forwarding elements without interfering with the existing forwarding state. This figure illustrates a physical forwarding element 805, a new-version controller 810, and an old-version controller 815. The physical forwarding element could be one of the PFEs that is being managed by an old-version controller, but is also being prepared by the new-version controller as illustrated in FIG. 7. The physical forwarding element 805 includes a primary table 820, and two secondary tables 825 and 830. In some embodiments, the physical forwarding element may have many more secondary tables. This example is shown with two secondary tables for simplicity.

In order for the controller nodes 810 and 815 to update the forwarding elements with the old and new versions of the forwarding data, the controller nodes 810 and 815 use multiple forwarding element (OVS) tables 820, 825, and 830. During the upgrade, a forwarding element receives updates to the forwarding state from controller 810 that has been upgraded, as well as controller 815 that is running the original version of the network control applications.

The network controllers write to separate sets of tables in order to avoid conflicts that may arise when multiple controllers using different versions of the network control applications are writing to the same instance of a database. In some embodiments, the controller will split the state in the current state in the primary table into the various forwarding element tables. Controller 810 will write to a particular subset of tables 830 using a new version (v1) of the network control applications, while controller 815 will write to a separate different subset of tables 825 using a different version (v0) of the network control applications. The number of tables used may vary in different embodiments (e.g., some embodiments may use six tables, while other embodiments use up to 256 tables).

The network controllers for each version of the state enter a set of records (i.e., the packet control data) in the primary table 820 of each physical forwarding element. The data packets match on the records in the primary table based on a version bit, which indicates the version of the network state that the data packet is using. Flows that match on the in_port (decode ingress tunnel decap and patch port ingress) will continue to exist in the primary table. These flows will set the version of the packets. All other flows will be pushed to non-primary tables on the physical forwarding elements. Each flow matches on a version associated with a packet. Different controller versions will use different ovs tables to push their state.

The forwarding element then forwards the data packets to secondary tables based on the matched record in the primary table. The first entry in the primary table 820 (noted with an encircled 1), points to a secondary table 825. The secondary table 825 contains the forwarding records for the old version (v0) of the network state. These records also forward to other secondary tables or within the table, in order to process a data packet. The second entry in the primary table 820 (noted with an encircled 2), points to a different secondary table 830. The secondary table 830 contains the forwarding records for the new version (v1) of the network state. The incoming packets are assigned to a version of the state based on a version bit. The version bit is described further below. In some embodiments, the entries matching on the version bit are the only entries in the primary table, allowing each version of the controllers to write a single entry into the table.

In order to use these different tables for different versions, daemons that access the forwarding element tables are modified in some embodiments. In some cases, daemons, like an L3 daemon (L3D), do not need to know about the new forwarding element tables. An L3D receives packets from the forwarding elements and resolves an L3 address into an L2 address.

When there is only one version of the network control applications running on the controller cluster, once an L3D has pushed a flow down to a forwarding element, it no longer expects to receive packets that would have matched that flow. However, the base flow across two versions will be different, so in some embodiments, the flows can be updated based on the table from which a particular packet is received. This implies that flows, like arp flows and NAT flows, that have been pushed to the forwarding element tables of an earlier version may have to be re-pushed to the new forwarding element table using the new base flow. For example, a packet with a particular L3 address may already have been sent to the L3D by a forwarding element using flows from the old version of the network control applications, but a packet going to the new-version flows in the new forwarding element table will also hit the L3D until L3D installs a new arp resolution flow on the forwarding element. In some embodiments, the new flows might have a different stage context format (e.g., vrf_ctxt+stage) that needs to be handled by L3D. An example of an L3 daemon is described in U.S. Patent Publication 2013/0148656, which is incorporated herein by reference.

E. Switching to the New Version and Completing the Upgrade

1. Upgrading the Decisive Controller Node

Figure 9:
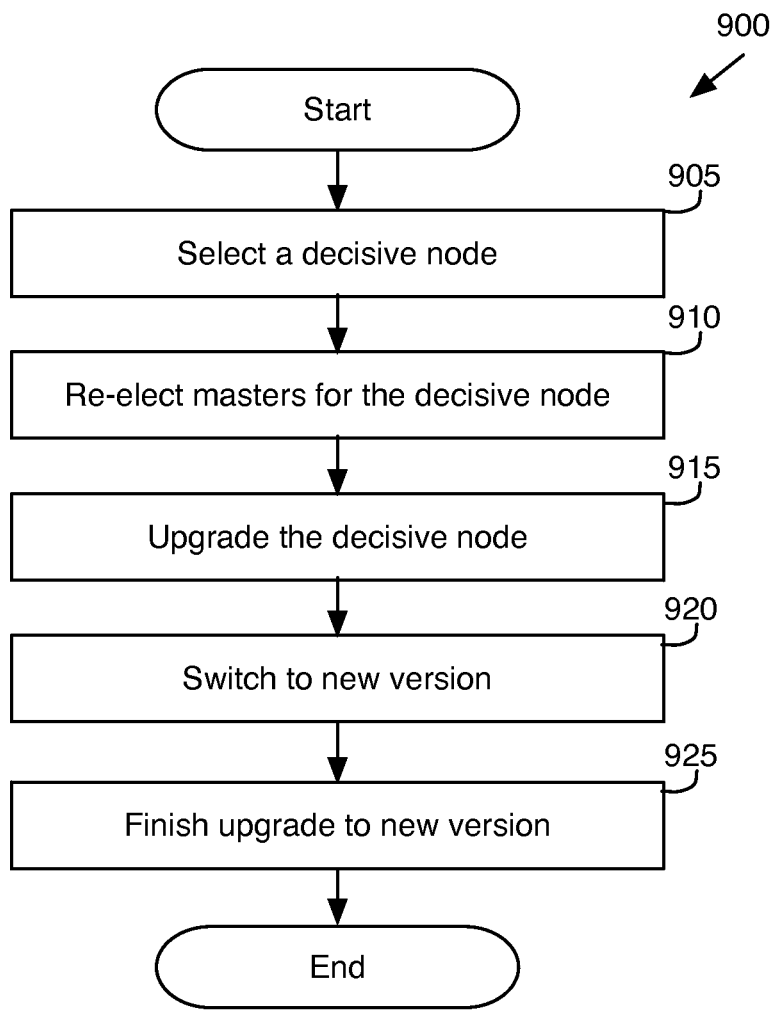
FIG. 9 conceptually illustrates a process for switching the system to use a new version.
Figure 10A:
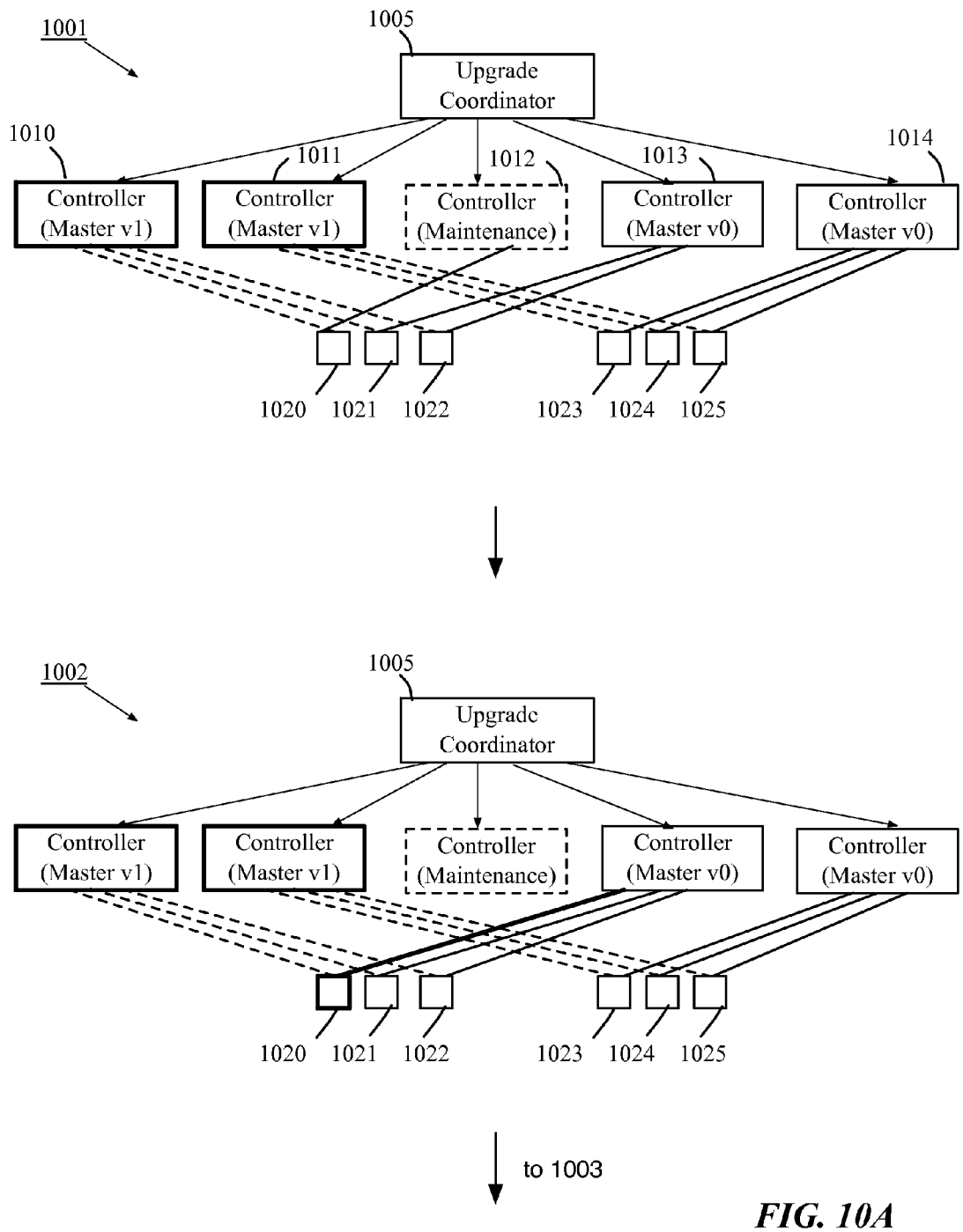
FIGS. 10A-B illustrate an example of switching a system to a new version.
Figure 10B:
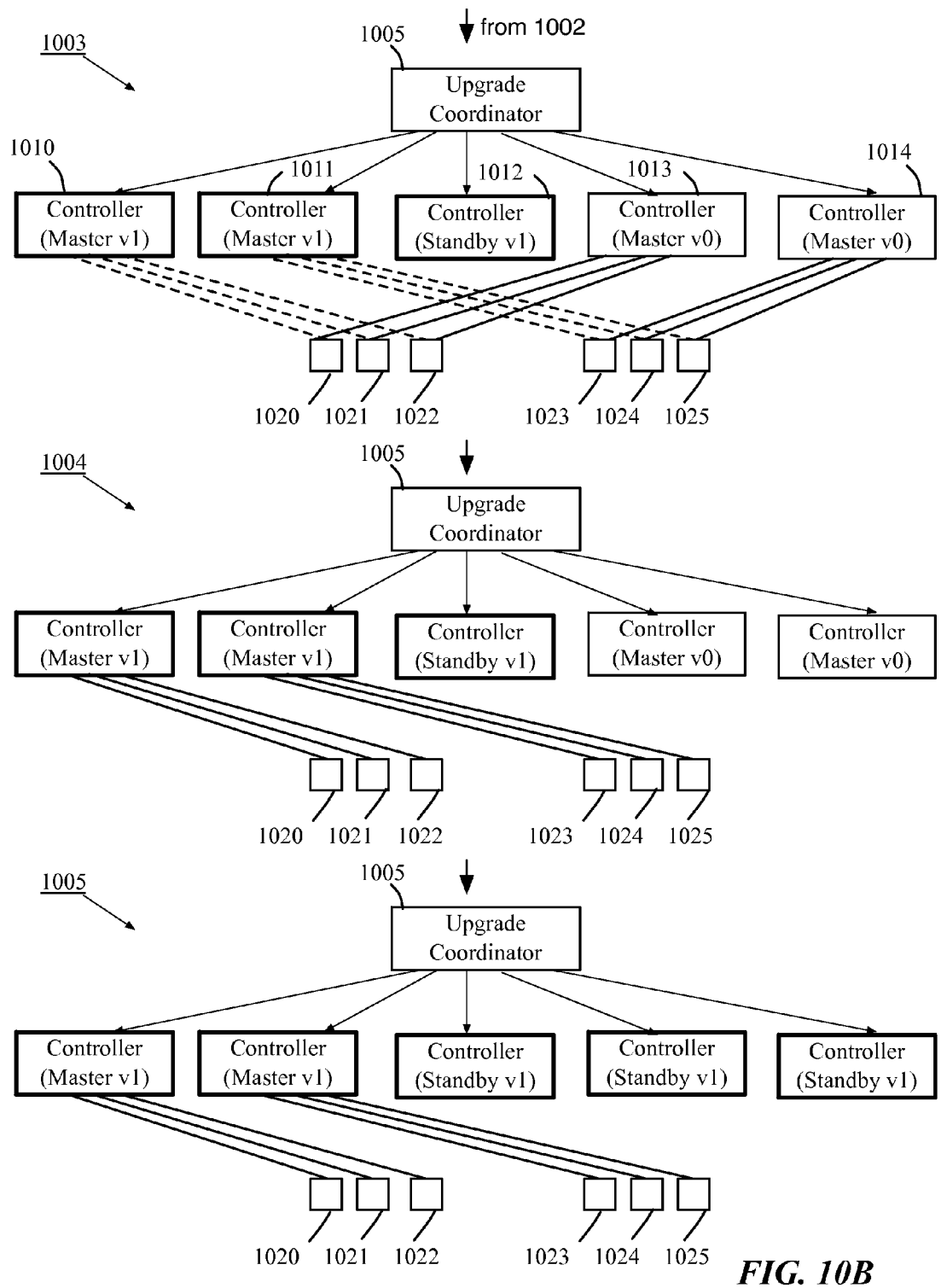

Once the upgraded controllers have pushed the data to the forwarding elements, the UC controller prepares to switch the system to the new version. FIG. 9 conceptually illustrates a process 900 for switching the system to use the new version. FIG. 9 is described with reference to FIGS. 10A-B. FIGS. 10A-B illustrate an example of switching a system to a new version in five stages 1001-1005. Once the ⌊n/2⌋ controller nodes have been upgraded (described above with reference to step 430 of FIG. 4), the process 900 begins by selecting (at 905) a decisive controller node (a controller node that signals the transition to the new version) and puts the decisive controller node into maintenance mode. The decisive controller node in some embodiments is the controller node after the upgrade of which, the majority of the controller nodes will have the new version of the network control applications. The decisive controller node will not enter maintenance mode until all the new-version controller nodes have completed their upgrades and stopped working.

Stage 1001 of FIG. 10A continues from FIG. 7 and illustrates that the controller nodes 1010 and 1011 have been upgraded and are ready to manage the forwarding elements 1020-1025. Stage 1001 also illustrates that decisive controller node 1012 has been selected and put into maintenance mode, much like the selected subset of controller nodes described with reference to FIGS. 5 and 7.

Like the selected subset of controller nodes described with reference to FIGS. 5 and 7, the process 900 re-elects (at 910) masters for the decisive controller node and upgrades (at 915) the decisive controller node to the new version of the controller. Stage 1002 illustrates that the forwarding element 1020 has been reassigned from the decisive controller node 1012 to an old-version controller node 1013. Stage 1003 of FIG. 10B illustrates that the decisive controller node 1012 has been upgraded to the new version (v1) and serves as a standby controller. In some embodiments, the coordination manager assigns the decisive controller node as a standby for the LDPSs and forwarding elements.

The transition of the decisive controller node and the switch to the new version is the most vulnerable time during the transition because both versions are running on half of the controllers with few or no standbys. A failure at this point would be difficult to handle since neither the old nor the new controllers have a majority. The handling of the various possible failures of controller nodes is described in greater detail below with reference to FIG. 11 and Table 1.

In order to minimize the transition time, a master is assigned for all of the forwarding elements during the upgrade of the subset of controller nodes and the decisive controller node serves as a standby for all of the forwarding elements. By preparing the subset of controller nodes to manage all of the forwarding elements and using the decisive controller node as a standby controller, the system is better able to manage potential controller failures and to shorten the time necessary to switch from the old system to the new system.

Once the decisive controller node is upgraded and assigned as a standby, a majority of the controller nodes operate the new version. Therefore, the process 900 switches (at 920) the network control system to use the new version of the network control applications by switching the version bit stored in packet metadata of the data packets, indicating that the new version of the network state should be used to process any incoming data packets. In addition, API calls to the controllers will now be directed to the controller nodes running the new version of the network control applications. Stage 1004 illustrates that upgraded controllers 1010 and 1011 have taken over the management of the forwarding elements 1020-1025. Decisive node 1012 is prepared as a standby controller in the new version.

Once the version bit has been flipped and the upgrade to the new version has gone live, the system finishes (at 925) the upgrade by upgrading the remaining controller nodes (i.e., the controller nodes that were not initially upgraded), garbage collecting the old flows used with the old version of the network control applications, and resuming garbage collection. Some physical resources like tunnels and possibly namespaces have to be shared across versions and hence reused. Stage 1005 illustrates that the remaining controller nodes 1013 and 1014 have been upgraded to the new version (v1) and are acting as standby controllers. As the old-version controller nodes are upgraded, the coordination manager assigns roles and responsibilities to the new controller nodes as they become available.

III. Handling Controller Failures

Figure 11:
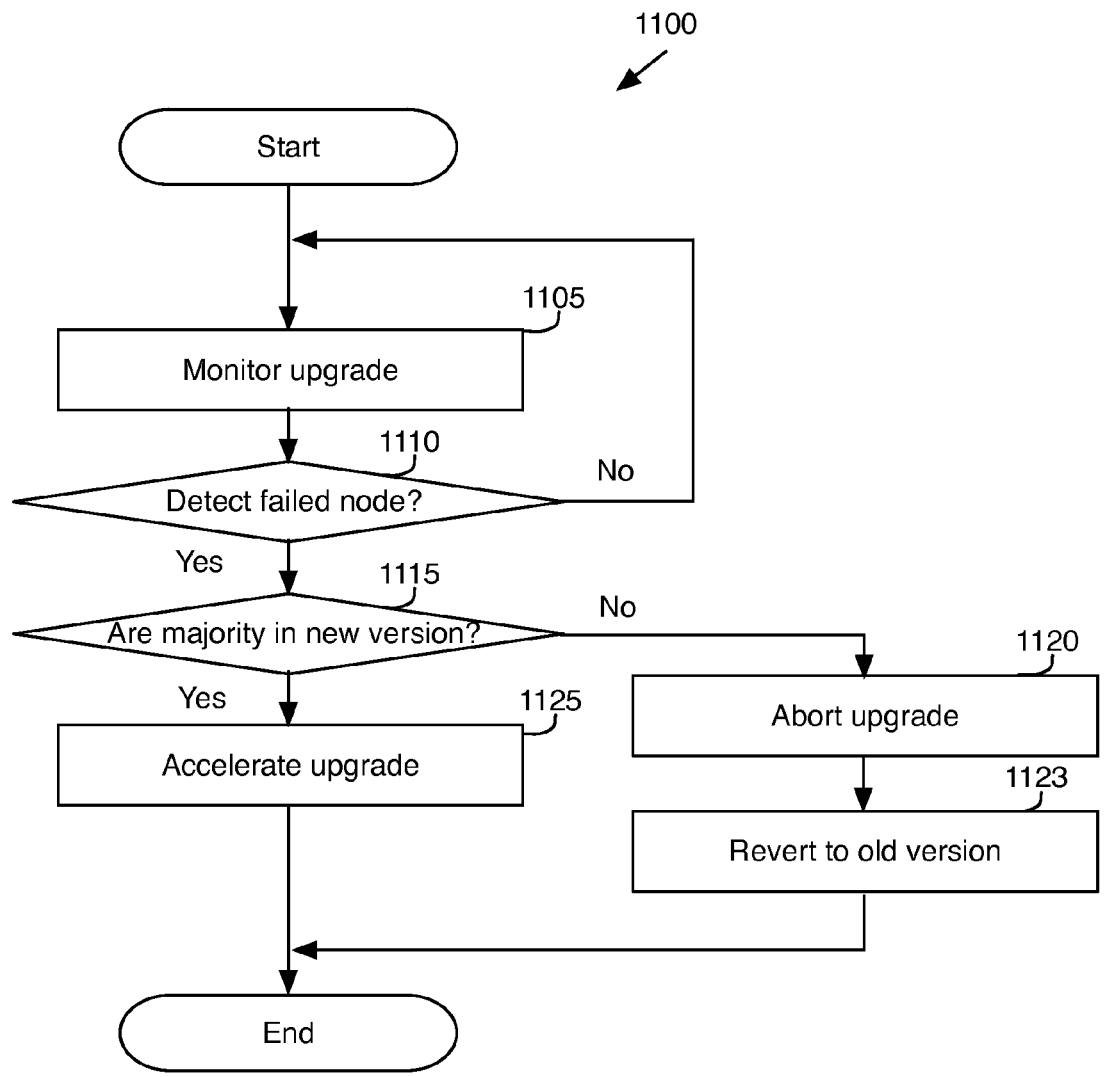
FIG. 11 conceptually illustrates a process for handling failed controller nodes in a controller cluster.

Until now, the upgrade process has been described without consideration for the potential failures of controller nodes. However, in order to provide a hitless upgrade of the controller cluster without disruption to the dataplane, it is important that controller failures be properly managed. FIG. 11 conceptually illustrates a simplified process for monitoring and handling failed controller nodes in a controller cluster. The process 1100 monitors (at 1105) the upgrade process, such as the one described in FIG. 1. When the process does not detect (at 1110) a failed controller node, the process continues monitoring for failed controller nodes. When the process does detect (at 1110) a failed controller node, the process 1100 determines (at 1115) whether the majority of the controller nodes have completed the upgrade to the new version. When the process determines (at 1115) that the majority of the controller nodes have not been upgraded, (i.e., the decisive controller node has not completed the upgrade), the process 1100 aborts (at 1120) the upgrade. The process 1100 reverts (at 1123) the upgraded controller nodes back to the old version of the network control applications and the process ends. When the process 1100 determines (at 1115) that the majority of the controller nodes have been upgraded (i.e., the decisive controller node has completed the upgrade), the process 1100 accelerates (at 1125) the upgrade to get the old version controllers up to the new version as quickly as possible and the process ends.

In each of the phases, controller nodes may fail to come up or crash. In some cases, a controller node fails such that no version in the cluster has a majority. In such a case, since no version of the cluster has a majority, there would be no network control applications updates, and API requests will redirect to the older version of the control cluster. However, the API updates will not take effect until a majority of the controllers are available in one version or the other. A user or administrator of the system is expected to take actions to get out of this situation as soon as possible. In some embodiments, the UC may also take steps to resolve the issue (e.g., restarting the controller). The UC controller can determine a crash by looking at the active list of controller nodes.

A controller node may fail during different phases of an upgrade of the controller cluster. The following Table 1 provides the different potential phases of an upgrade and the listing of the various situations in which a controller may crash, as well as the remarks on the result of the crash, the preferred reaction of the UC controller behavior, and the recommended user intervention.

TABLE 1

| Phase:<br>0 -> old controller version<br>1 -> new controller version | Event | Remarks | Upgrade coordinator behavior | Recommended user intervention |
| --- | --- | --- | --- | --- |
| Phase - Ia (000x1) | New controller crashes | No real issue. | Abort upgrade | Diagnose outage and retry upgrade thereafter. |

TABLE 1-continued

| Phase: 0 -> old controller version 1 -> new controller version | Event | Remarks | Upgrade coordinator behavior | Recommended user intervention |
|---|---|---|---|---|
| Phase - Ib (0x011) | Old controller crashes | Cluster has n/2 controller nodes in each version, tiebreak goes to the older version. Causes control plane downtime. | Abort upgrade (shut down new controller if possible) | Shutdown new controller so another failure of an old controller node won't start redirecting the APIs to the new version. |
| Entry into Phase - II | | Effectively computing flow in two versions, so need to maximize computing resources. | The upgrade coordinator will not proceed to phase-II if any controller is down. | Suggest a procedure to downgrade a controller node. |
| Phase - IIa (00x11) | Crash before the decisive controller joins the new version cluster | Same as Phase Ib. | Same as Phase Ib. | Same as Phase Ib. |
| Phase - IIb (00x11) | Crash of the decisive controller node after the decisive controller node joins the new cluster | Majority has now moved to new version, there are masters for all LDPSs and forwarding elements in the new version. Cluster goes to the new version | Hasten to Phase III | Nothing to do but report issue. |
| Phase - IIc (001x1) or (0x111) | Crash of any other controller node when waiting for the decisive controller node to come up | In some cases, will be in either phase-I or II | Assuming decisive controller node comes back up hasten to phase-III | Nothing to do but report issue. |
| Phase - IIIa | Crash of new controller node. | Cluster has started to switch over to the new version. | Proceed with the upgrade and continue upgrading the new controller nodes. | Nothing to do report issue. |
| Other failures | Node doesn't enter maintenance mode. | Any controller node that is entering maintenance mode is not involved in mastering the LDPSs and forwarding elements. | Abort upgrade after waiting for specified period of time. | Nothing to do report issue. |

As shown in Table 1 above, there are three main phases (I, II, and III) during which a controller may fail during the upgrade. Each phase presents different possible situations that may arise. For example, Phase Ia describes a situation where a new controller (i.e., a controller selected for upgrade) crashes, whereas Phase Ib describes a situation where an old controller (i.e., a controller not selected for upgrade) crashes. The table provides greater detail for the process 1100 described with reference to FIG. 11. Table 1 describes how the system should react, as well as potential user intervention that may be required based on the particular node that fails and the phase during which it fails.

IV. Electronic System

Figure 12:
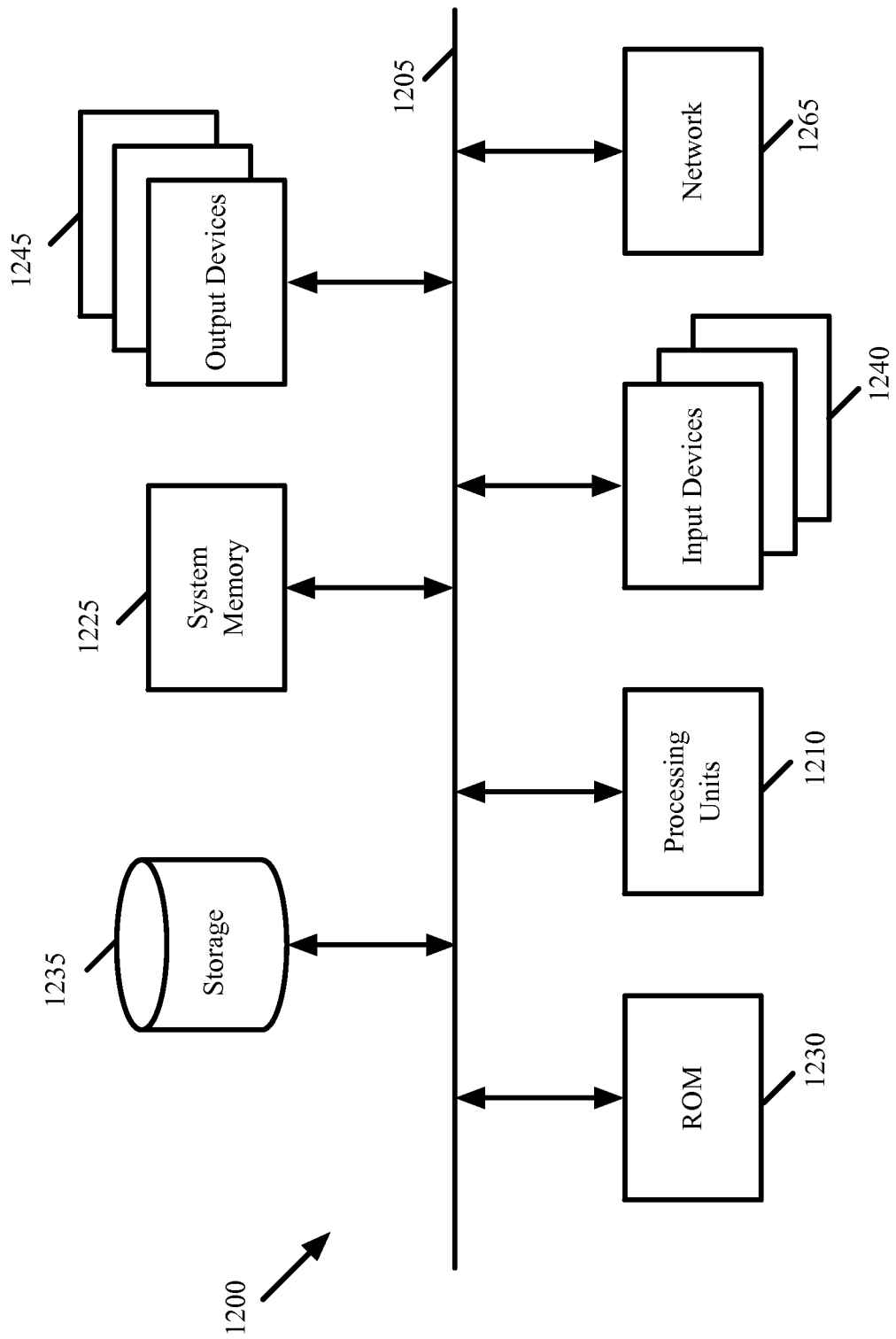
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 4, 9, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A method for upgrading a controller cluster comprising a plurality of controller nodes, the controller cluster for managing a plurality of forwarding elements, each controller node executing a version of a network control application, the method comprising:

upgrading a first subset of the plurality of controller nodes to execute a newer version of the network control application while managing the forwarding elements with a second subset of the plurality of controller nodes that execute an older version of the network control application;

upon completion of the upgrade of the first subset of controller nodes, upgrading a decisive controller node in the second subset of controller nodes to signal the controller cluster to manage the forwarding elements with the first subset of controller nodes;

upgrading the second subset of controller nodes to the newer version of the network control application while managing the forwarding elements with the first subset of controller nodes and the decisive controller node; and upon completion of the upgrade of the second subset of controller nodes, managing the forwarding elements with the first and second subsets of controller nodes.

2. The method of claim 1, wherein the forwarding elements comprise a plurality of virtual interfaces (VIFs), wherein upgrading the controller nodes of the first subset comprises upgrading a set of forwarding data for each VIF in the plurality of VIFs.

3. The method of claim 1, wherein managing the forwarding elements with the first subset of controller nodes comprises using the first subset of controller nodes to write to a first set of tables on the forwarding elements, wherein managing the forwarding elements with the second subset of controller nodes comprises using the second subset of controller nodes to write to a second, different set of tables on the forwarding elements, wherein the first and second sets of tables are for storing records regarding forwarding behavior of the forwarding elements.

4. The method of claim 3, wherein storing records regarding the forwarding behavior of the forwarding elements comprises storing flows that implement a forwarding behavior on the forwarding elements.

5. The method of claim 4, wherein a particular packet received at a particular forwarding element is forwarded according to one of the first and second sets of tables based on a version bit located in metadata of the particular packet.

6. The method of claim 5, wherein managing the forwarding elements with the second subset further comprises setting a particular value in the version bit for packets passing through the forwarding elements, wherein managing the forwarding elements with the first subset further comprises setting a different value in the version bit for packets passing through the forwarding elements.

7. The method of claim 4, wherein the forwarding elements comprise a set of logical forwarding elements and a set of physical forwarding elements, wherein managing the forwarding elements with the first subset of controller nodes further comprises implementing the set of logical forwarding elements on the set of physical forwarding elements using the newer version of the network control application.

8. The method of claim 7, wherein the set of logical forwarding elements comprises a first set of logical forwarding elements for a first user and a second set of logical forwarding elements for a second user.

9. The method of claim 7 further comprising:
generating a set of flows on the first subset of controller nodes, the set of flows for implementing the set of logical forwarding elements on the set of physical forwarding elements; and
writing the set of flows to the second set of tables on the set of physical forwarding elements.

10. The method of claim 1, wherein the controller cluster performs a master election for the forwarding elements when availability for a controller node changes.

11. A non-transitory machine readable medium storing a program for execution by at least one processing unit, the program for coordinating the upgrade of a controller cluster comprising a plurality of controller nodes, the controller cluster for managing a plurality of forwarding elements, each controller node executing a version of a network control application, the program comprising sets of instructions for:
upgrading a first subset of the plurality of controller nodes to execute a newer version of the network control application while managing the forwarding elements with a second subset of the plurality of controller nodes that execute an older version of the network control application;
upon completion of the upgrade of the first subset of controller nodes, upgrading a decisive controller node in the second subset of controller nodes to signal the controller cluster to manage the forwarding elements with the first subset of controller nodes;
upgrading the second subset of controller nodes to the newer version of the network control application while managing the forwarding elements with the first subset of controller nodes and the decisive controller node; and
upon completion of the upgrade of the second subset of controller nodes, managing the forwarding elements with the first and second subsets of controller nodes.

12. The non-transitory machine readable medium of claim 11, wherein the first subset of controller nodes has the same number of controller nodes as the second subset.

13. The non-transitory machine readable medium of claim 11, wherein the set of instructions for upgrading the first subset comprises sets of instructions for:
determining whether a controller node is a master or a standby controller; and
when the controller node is a standby controller, selecting the standby controller as part of the first subset.

14. The non-transitory machine readable medium of claim 11, wherein the forwarding elements comprise a set of physical forwarding elements and a set of logical forwarding elements, wherein the set of instructions for managing forwarding elements with the first subset of controller nodes comprises a set of instructions for implementing the set of logical forwarding elements on the set of physical forwarding elements.

15. The non-transitory machine readable medium of claim 11, the set of instructions for upgrading the first subset of controller nodes comprises a set of instructions for electing a master controller node from the first subset of controller nodes for each forwarding element.

16. An apparatus comprising:
a processing unit;
a storage for storing a program for coordinating the upgrade of a controller cluster comprising a plurality of controller nodes, the controller cluster for managing a plurality of forwarding elements, each controller node executing a version of a network control application, the program comprising sets of instructions for:
upgrading a first subset of the plurality of controller nodes to execute a newer version of the network control application while managing the forwarding elements with a second subset of the plurality of controller nodes that execute an older version of the network control application;
upon completion of the upgrade of the first subset of controller nodes, upgrading a decisive controller node in the second subset of controller nodes to signal the controller cluster to manage the forwarding elements with the first subset of controller nodes;
upgrading the second subset of controller nodes to the newer version of the network control application while managing the forwarding elements with the first subset of controller nodes and the decisive controller node; and
upon completion of the upgrade of the second subset of controller nodes, managing the forwarding elements with the first and second subsets of controller nodes.

17. The apparatus of claim 16, wherein the set of instructions for upgrading the first subset comprises a set of instructions for identifying no more than half of the controller nodes to be upgraded to the newer version.

18. The apparatus of claim 16, wherein the set of instructions for managing the forwarding elements with the second subset of controller nodes comprises a set of instructions for identifying master and standby controller nodes from the second subset, wherein a standby controller node serves as a backup to a master controller node.

19. The apparatus of claim 16, wherein the program further comprises a set of instructions for removing the older version of the network control applications from the controller nodes.

20. The apparatus of claim 16, wherein the forwarding elements comprise a set of physical forwarding elements and a set of logical forwarding elements, wherein the set of instructions for managing forwarding elements with the first subset of controller nodes comprises a set of instructions for implementing the set of logical forwarding elements on the set of physical forwarding elements.

\* \* \* \* \*